United States Patent
O'Callaghan

(10) Patent No.: US 9,516,387 B2
(45) Date of Patent: Dec. 6, 2016

(54) SYSTEMS, METHODS, AND USER INTERFACES FOR FACILITATING USER ACCESS TO MEDIA CONTENT

(71) Applicant: Verizon Patent and Licensing Inc., Arlington, VA (US)

(72) Inventor: Daniel J. O'Callaghan, Fairfax Station, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 731 days.

(21) Appl. No.: 13/724,265

(22) Filed: Dec. 21, 2012

(65) Prior Publication Data
US 2014/0181868 A1    Jun. 26, 2014

(51) Int. Cl.
*H04N 21/482* (2011.01)
*H04N 21/472* (2011.01)

(52) U.S. Cl.
CPC ........ *H04N 21/4821* (2013.01); *H04N 21/482* (2013.01); *H04N 21/47202* (2013.01); *H04N 21/47217* (2013.01)

(58) Field of Classification Search
CPC ........... H04N 21/482; H04N 21/4332; H04N 21/26283; H04N 21/23109; H04N 2005/441; H04N 2005/4412
See application file for complete search history.

(56) References Cited

U.S. PATENT DOCUMENTS

| | | | |
|---|---|---|---|
| 2003/0149988 A1* | 8/2003 | Ellis et al. | 725/87 |
| 2004/0205816 A1* | 10/2004 | Barrett | 725/49 |
| 2011/0083140 A1* | 4/2011 | Kim | H04N 5/46 725/28 |
| 2013/0055310 A1* | 2/2013 | Vanduyn et al. | 725/40 |
| 2013/0055311 A1* | 2/2013 | Kirby et al. | 725/44 |

* cited by examiner

*Primary Examiner* — Rong Le

(57) ABSTRACT

An exemplary method includes a media program guide user interface system 1) displaying a forward-looking view of a media program guide, the forward-looking view including a matrix grid of cells arranged relative to a channel axis and a forward-looking time axis, the cells representing media programs scheduled for transmission on channels arranged along the channel axis and at times arranged along the forward-looking time axis in accordance with a media transmission schedule, 2) detecting an association between content of the forward-looking view and a recorded media program available to a media content access system, and 3) presenting, together with the forward-looking view in response to the detecting, a selectable option configured to be selected by a user to trigger a display of a backward-looking view of the media program guide. Corresponding methods and systems are also disclosed.

24 Claims, 22 Drawing Sheets

SYSTEMS, METHODS, AND USER INTERFACES FOR FACILITATING USER ACCESS TO MEDIA CONTENT

BACKGROUND INFORMATION

Options for accessing and experiencing media programs such as television programs have increased substantially in recent years. For example, users of consumer electronic devices may access and experience television programs as the television programs are transmitted live in accordance with a television transmission schedule over the air, cable television services, satellite television services, and the Internet. Such options may be referred to as "live media content options."

Users may also access and experience television programs at their convenience, independent of television transmission schedules. Such options may be referred to as "user-controlled media content options" and may include multiple subcategories of options.

One subcategory of user-controlled options may allow users to access and experience television programs in a time-shifted manner. For example, television programs may be recorded from live transmissions of the television programs, and the recordings of the television programs may be played back later in time than the live transmissions. This subcategory of user-controlled options may be referred to as "recorded media content options."

Another subcategory of user-controlled options may allow users to access and experience television programs on-demand in ways that do not arise from scheduled live transmissions of television programs. For example, users may download and/or stream television programs on-demand over the Internet. This subcategory of user-controlled options may be referred to as "on-demand media content options."

Conventional user interfaces that are configured for use by users to locate, access, and experience media programs such as television programs are typically as disparate and/or independent as are the different options for accessing and experiencing the media programs. In a typical example, one user interface is dedicated for use by users to locate, access, and experience live transmissions of television programs in accordance with a live transmission schedule, another user interface is dedicated for use by users to locate, access, and experience recorded television programs in a time-shifted manner, and yet another user interface is dedicated for use by users to locate, access, and experience on-demand television programs.

These user interfaces are conventionally separate one from another and/or have unique or otherwise different characteristics, such as different visual layouts, navigation tools, navigation flows, organizations, and/or theories of operation. Moreover, the user interfaces may operate independently and may require that users return to a high-level within a navigation flow in order to switch from one user interface to another. To illustrate, a user using a user interface to locate live transmissions of television programs may be required to entirely leave that user interface (and its characteristics) in order to access any information about recorded or on-demand television programs in an entirely separate user interface (that has its own characteristics).

Such an inconvenient user interface navigation flow may make it difficult for users to access all of the information about media content options available to them and/or to make optimal choices regarding media programs they access, experience, and/or capture. For example, a user using one user interface may be unaware of the availability of a television program that is accessible only through another user interface, which is reachable only through an inconvenient user interface navigation flow. In like manner, a user using one user interface may unwittingly choose to use finite resources to record a television program that is already or will be available to the user through another option (e.g., an option that does not require the finite resources to be used to record the television program) because information about the availability of the television program through the other option is restricted to a separate user interface reachable only through an inconvenient user interface navigation flow.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
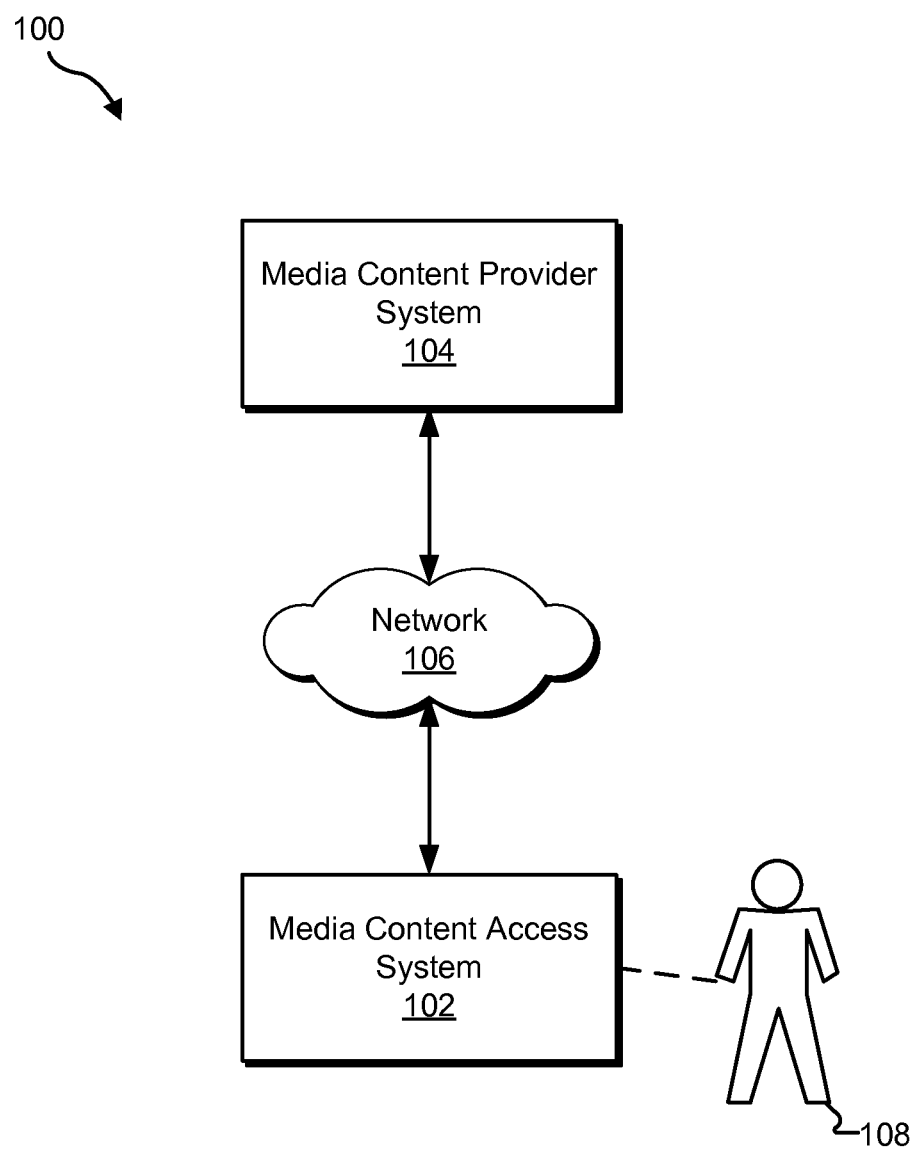
FIG. 1 illustrates an exemplary configuration in which a media content access system is communicatively coupled to a media content provider system according to principles described herein.

Systems, methods, and user interfaces for facilitating user access to media content are described herein. In certain examples, exemplary systems and methods described herein may provide a user interface configured to provide enhanced accessibility to media content and/or information about media content. For example, the user interface may include an interactive media program guide user interface configured to provide information about and/or accessibility to both live media content options and user-controlled media content options (e.g., recorded and/or on-demand media content options) that are available and/or will be available to a user.

To illustrate one example, as described in more detail below, a media guide user interface system may display a forward-looking view of a media program guide including a matrix grid of cells that represent media programs scheduled for transmission on channels arranged along a channel axis of the matrix grid and at times arranged along a time axis of the matrix grid in accordance with a media transmission schedule. The media program guide user interface system may detect an association between content of the forward-looking view of the media program guide and a recorded media program available to a media content access system and, in response, may present, together with the forward-looking view, a selectable option configured to be selected by a user to trigger a display of a backward-looking view of the media program guide.

If the option is selected by the user, the backward-looking view may be presented by the media program guide user interface system. In certain examples, the backward-looking view may include a backward-looking matrix grid of cells similar in layout, usability, and/or other characteristics to the matrix grid of cells of the forward-looking view. The cells in the backward-looking view may represent recorded media programs available for the user to experience. In other examples, the backward-looking view may represent available recorded media programs in other ways, such as by items arranged in a list. Examples of backward-looking views of a media program guide are described herein.

To illustrate an additional or alternative example, the media program guide user interface system may determine that a media program included within the media programs represented in the forward-looking view of the media program guide is designated for automatic recording by a network digital video recording ("NDVR") facility. In response to this determination, the media program guide user interface system may present, together with the forward-looking view, a visual indicator indicating that the recording of the media program by the NDVR facility will become accessible to the user (e.g., to a media content access system associated with the user).

If the media program guide user interface system receives a user input command to record onto a local digital video recording ("DVR") device a media program that is designated for automatic recording by the NDVR facility, the media program guide user interface system may provide a notification that the media program is designated for recording by the NDVR facility and/or that the local recording is unnecessary. Examples of such visual indicators, notifications, and options associated with the visual indicators and/or notifications are described herein.

In certain examples, exemplary systems and methods described herein may manage recording conflicts, such as recording conflicts that occur when insufficient local DVR resources (e.g., an insufficient number of tuners) are available to perform all of the recordings requested by a user. For example, exemplary system and methods described herein may leverage information about designated recordings of media programs by an NDVR facility to mitigate recording conflicts.

To illustrate one example, a recording conflict management system may detect a recording conflict between a set of requested recordings of a set of media programs and determine that a media program included in the set of media programs is designated for automatic recording by an NDVR facility. The recording conflict management system may perform at least one conflict mitigation operation that leverages the information that the media program is designated for automatic recording by the NDVR facility. Examples of using information associated with an NDVR facility to mitigate recording conflicts are described herein.

As used herein, the term "media content" may refer generally to any content that may be accessed and/or presented by a media content access system for experiencing by a user of the media content access system. The term "media content program" (or simply, "media program") as used herein may refer generally to any instance of media content, including any television program, motion picture, pay-per-view media program, broadcast media program (e.g., broadcast television program), multicast media program, narrowcast media program, IPTV program, streamed media program, recorded live transmission of a media program, video program, radio program, podcast, audio program, and any other form of media content that may be accessed and presented by the media content access system. Media programs may be said to be "experienced" by a user when the user watches, listens to, or otherwise experiences the media content in the media program. Media programs may commonly be composed of digital data, and consequently may be stored, transmitted, and manipulated in a variety of ways. For example, media programs may be broadcast over the air, broadcast via cable or other networks, streamed, downloaded, recorded, played back, etc.

As used herein, "live media programs" may refer to media programs scheduled for transmission (e.g., broadcast) in accordance with a live transmission schedule (e.g., a television programming schedule) defined by an entity other than a user who may experience the media programs in accordance with the live transmission schedule (e.g., an entity such as a media program distribution service provider). "Non-live media programs" may refer to media programs that are available for access by a user at the request of the user (e.g., in accordance with a schedule of the user rather than in accordance with an entity other than the user). Non-live media programs may include recorded media programs (e.g., recordings of live transmissions of live media programs captured by NDVR and/or local DVR devices) and on-demand media programs.

As used herein, "channels" may refer generally to any carrier of media programs, including, but not limited to, media (e.g., television) channels, streams, addresses, frequencies or other carriers of media programs. In some examples, channels may include frequency bands to which a media content access system may tune to access media programs carried over the frequency bands. Additionally or alternatively, channels may include virtual channels that are mapped to frequency bands to which the media content access system may tune to access media programs carried over the frequency bands.

Exemplary systems, methods, and user interfaces for facilitating user access to media content will now be described with reference to the accompanying drawings.

FIG. 1 illustrates an exemplary configuration 100 in which a media content access system 102 ("access system 102") is communicatively coupled to a media content provider system 104. As will be described below, various components of an exemplary media guide management system and/or a recording conflict management system described herein may be implemented by access system 102 and/or media content provider system 104.

Access system 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Access system 102 and media content provider system 104 may communicate using any suitable network. For example, as shown in FIG. 1, access system 102 and media content provider system 104 may be configured to communicate with each other by way of network 106. Network 106 may include one or more networks or types of networks capable of carrying communications and/or data signals between access system 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with a service provider (e.g., a subscriber television service provider, an Internet service provider, a DVR service provider, etc.), a media content provider (e.g., ESPN, NBC, etc.), and/or any other type of content provider. Accordingly, media content provider system 104 may be configured to provide one or more media content services (e.g., DVR services, television services, video-on-demand services, Internet services, electronic program guide services, etc.) to access system 102 and/or to users by way of access system 102. For example, media content provider system 104 may be configured to manage (e.g., maintain, process, distribute, and/or generate) media content and/or electronic program guide data configured to be delivered to access system 102. Media content provider system 104 may be implemented by one or more computing devices (e.g., one or more servers associated with one or more entities) as may serve a particular implementation. An exemplary implementation of media content provider system 104 will be described below.

Access system 102 may facilitate access by one or more users to media content provided by media content provider system 104. For example, access system 102 may present and/or record media programs at the direction of one or more users. To this end, access system 102 may include one or more tuners. Each tuner may be configured to be tuned to a particular media program at the direction of access system 102 and/or at the direction of a user of access system 102. This may be performed in any suitable manner. For example, a tuner may tune to a media program by tuning to a media channel carrying the media program. Additionally or alternatively, a tuner may tune (e.g., switch) to a digital stream of data packets (e.g., Internet Protocol ("IP") based data packets) carrying the media program. A "tuner" may be implemented by one or more hardware components and/or one or more software components.

In some examples, access system 102 may be associated with a user account maintained by and/or otherwise corresponding to one or more users (e.g., user 108 shown in FIG. 1). For example, the user may associate his or her user account with access system 102 by subscribing to a service provided by way of access system 102 (e.g., by purchasing a subscription package from a subscriber television service provider), registering the user account with access system 102 (e.g., by logging in to access system 102), and/or in any other manner.

In some examples, access system 102 may be provided and/or otherwise managed by a service provider associated with media content provider system 104. For example, access system 102 may be provided by a subscriber television service provider.

Access system 102 may be implemented by any suitable combination of media content processing or computing devices ("processing devices"). For example, access system 102 may be implemented by one or more local processing devices each associated with the same user account (i.e., processing devices that the user interacts with directly such as set-top box devices, DVR devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
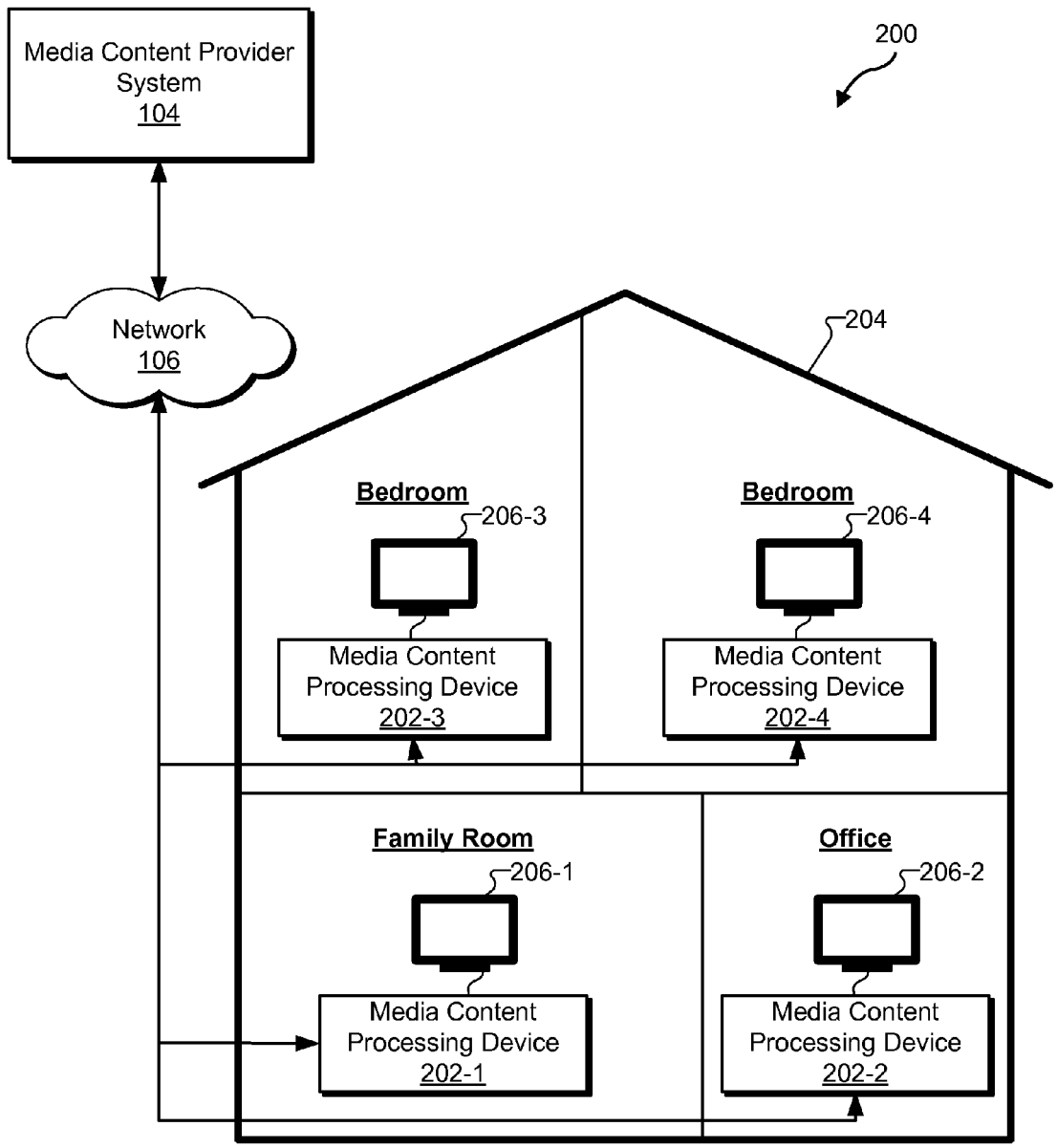
FIG. 2 shows an exemplary implementation of a media content access system according to principles described herein.

To illustrate, FIG. 2 shows an exemplary implementation 200 of access system 102 in which access system 102 is implemented by a plurality of media content processing devices 202 (e.g., media content processing devices 202-1 through 202-4) located within a particular premises 204 (e.g., a customer premises such as a home). Each media content processing device 202 may be implemented by one or more of the local processing devices described herein. For example, each media content processing device may be implemented by a set-top box device having DVR capabilities.

As shown, media content processing device 202 may be distributed throughout premises 204. For example, FIG. 2 shows that media content processing devices 202 are distributed throughout various rooms of premises 204. In this manner, users located within premises 204 may experience and/or otherwise interact with media content at various locations throughout premises 204.

Media content processing devices 202 may each be associated with (e.g., connected to) a display 206 (e.g., displays 206-1 through 206-4). Displays 206 may include any suitable display device separate from media content processing devices 202 (e.g., televisions, computer monitors, etc.) and/or any suitable display device integrated into media content processing devices 202 (e.g., display screens). Media content processing devices 202 may be configured to present media content by way of displays 206.

As shown, each media content processing device 202 may be communicatively coupled to media content provider system 104 by way of network 106. This may be realized in any suitable manner, such as directly or by way of one or more intermediary devices such as a gateway device at premises 204.

Figure 3:
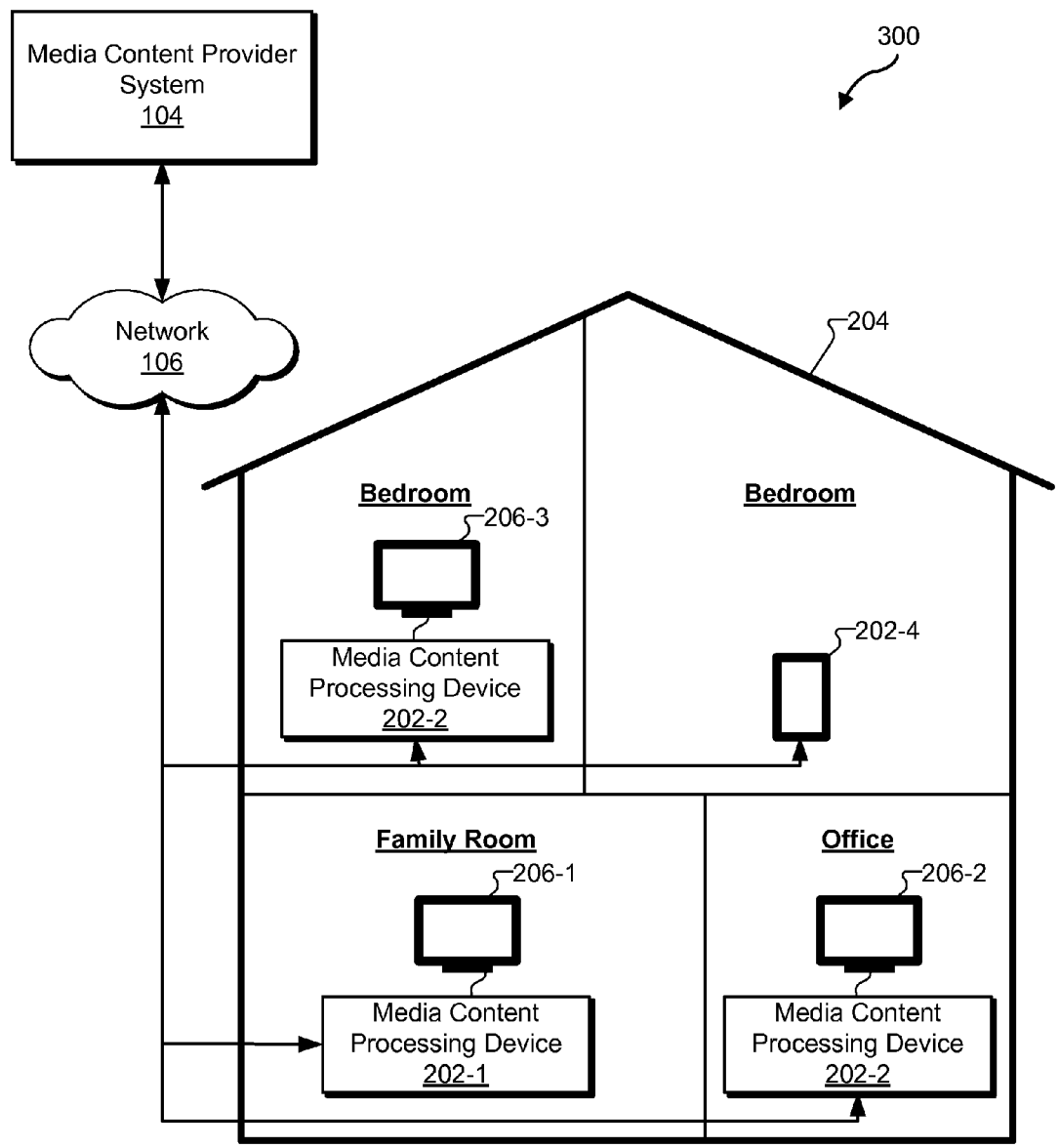
FIG. 3 shows another exemplary implementation of a media content access system according to principles described herein.

The processing devices 202 and/or the configuration of processing devices 202 illustrated in FIG. 2 are illustrative only. Other processing devices 202 and/or configurations of processing devices 202 may be used to implement access system 102. For example, access system 102 may be implemented by a single processing device 202 associated with a user account. As another example, FIG. 3 shows an exemplary implementation 300 of access system 102 in which access system 102 is implemented by a plurality of processing devices 202 (e.g., processing devices 202-1 through 202-4) and at least one of the processing devices 202 (e.g., processing device 202-4) is a mobile device (e.g., a tablet computer), which in certain examples may be configured to operate as a companion device to one or more of the other processing devices 202 (e.g., processing devices 202-1 through 202-3). In such an implementation, the processing devices 202 may be configured to communicate one with another by way of a local area network such as a home Wi-Fi network.

Figure 4:
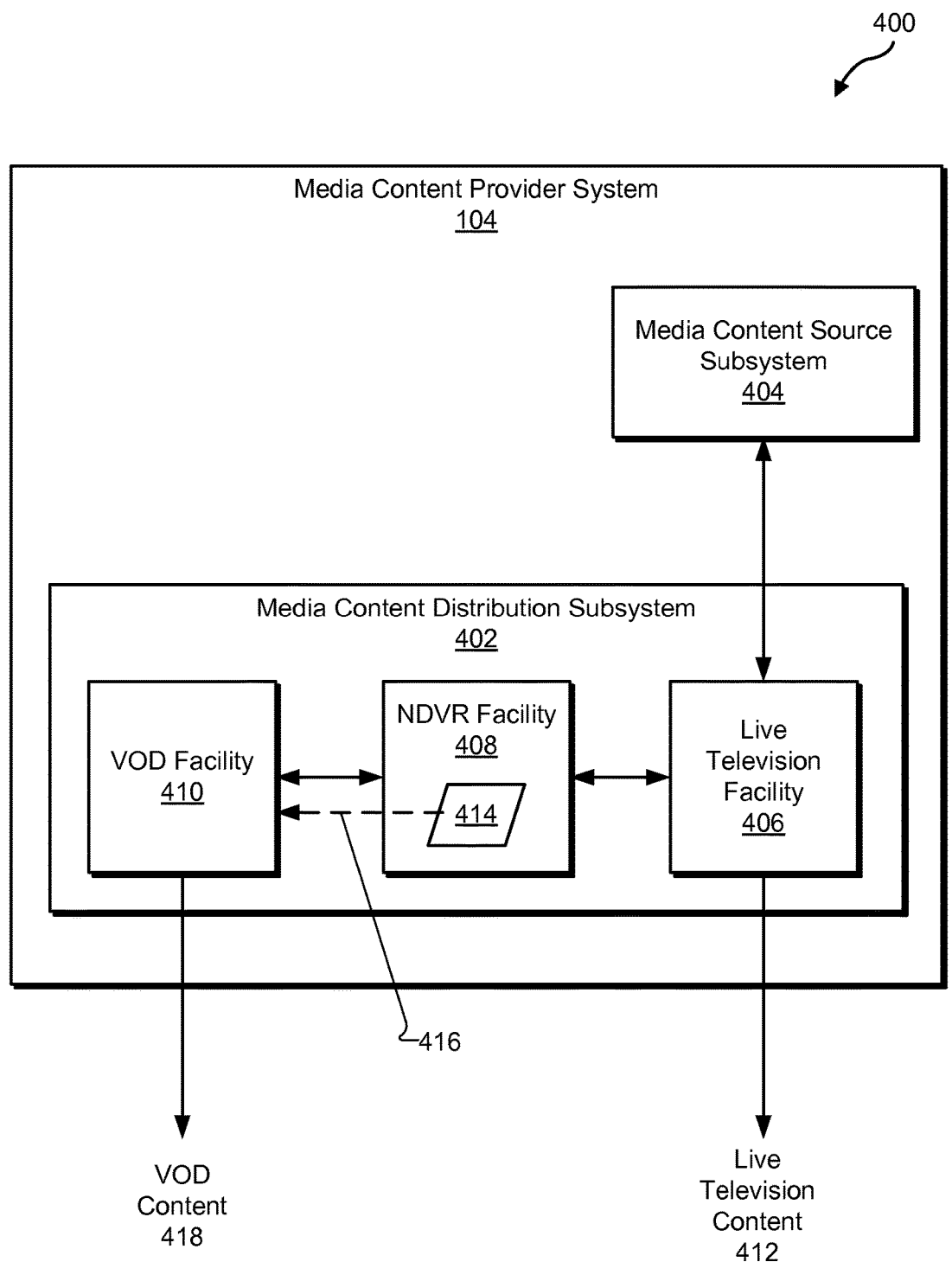
FIGS. 4-5 illustrate an exemplary implementation of a media content provider system according to principles described herein.

FIG. 4 illustrates an exemplary implementation 400 of media content provider system 104. As shown, media content provider system 104 may include a media content distribution subsystem 402 communicatively coupled to a media content source subsystem 404. Subsystems 402 and 404 may communicate using any suitable communications technologies, including any of the communications technologies mentioned herein.

Media content source subsystem 404 may be implemented by one or more computing devices (e.g., one or more server devices) associated with (e.g., operated by) one or more media content providers (e.g., CNN, HBO, EPIX, etc.). Media content source subsystem 404 may be configured to function as a source of media content for media content distribution subsystem 402. To this end, media content source subsystem 404 may transmit signals carrying media content to media content distribution subsystem 402.

Media content distribution subsystem 402 may be implemented by one or more computing devices (e.g., one or more server devices) associated with a media content distribution service provider such as a subscriber television service provider. Media content distribution subsystem 402 may be configured to receive media content from media content source subsystem 404 and distribute the media content to one or more end-users of one or more services provided by media content distribution subsystem 402.

In certain examples, media content distribution subsystem 402 may include a live television facility 406, an NDVR facility 408, and a video-on-demand ("VOD") facility 410 communicatively coupled as shown in FIG. 4. Facilities 406-410 may be implemented by one or more computing devices and/or electronic equipment configured to perform the operations of the facilities 406-410 described herein.

Live television facility 406 may be configured to receive live television content 412 (e.g., live transmissions of television programs) from media content source subsystem 404 and to distribute the live television content 412 in accordance with a live television transmission schedule to one or more end-users of a live television service provided by media content distribution subsystem 402. Live television facility 406 may include any equipment arranged in any architecture (e.g., super head-end office, central offices, local offices, etc.) suitable for performing these operations of live television facility 406.

NDVR facility 408 may be configured to record live transmissions of media content. For example, NDVR facility 408 may communicate with live television facility 406 to access and record one or more live television programs that are received and distributed by live television facility 406 as described above. FIG. 4 shows an example of a recorded media program 414 within NDVR facility 408.

NDVR facility 408 may be further configured to provide data representative of recorded media programs (e.g., of the recordings of live television programs captured by NDVR facility 408) to VOD facility 410. For example, dashed arrow 416 represents data representative of a recorded media program being provided by NDVR facility 408 to VOD facility 410.

In certain examples, NDVR facility 408 may be used by media content distribution subsystem 402 in the background (e.g., not transparent to a user of access system 102) to populate a library of VOD assets maintained and distributed by VOD facility 410 as part of a VOD service. Additionally or alternatively, NDVR facility 408 may provide an NDVR service to a user of access system 102. The NDVR service may allow the user to schedule network recordings of live media programs by NDVR facility 408.

VOD facility 410 may be configured to store data representative of the recorded media programs received from NDVR facility 410. VOD facility 410 may be further configured to distribute the recorded media programs as VOD content 418 to one or more end-users of a VOD service provided by media content distribution subsystem 402.

In certain examples, the recording and distribution of recorded media programs by NDVR facility 408 and VOD facility 410 may be performed in accordance with one or more business rules, which may be defined by an operator of media content distribution subsystem 402. Such business rules may be defined to memorialize agreements between the operator of media content distribution subsystem 402 and one or more media content providers associated with media content source subsystem 404. Accordingly, the business rules may specify one or more rules configured to be followed by media content distribution subsystem 402 to record and distribute recorded media programs as VOD content 418.

In certain examples, the business rules may specify specific media programs that are allowed or not allowed to be recorded by NDVR facility 408. In other examples, the business rules may specify one or more time constraints within which recorded media programs may be made available as VOD content 418. For example, the business rules may specify that certain media programs may be made available as VOD content 418 beginning at a predefined time after the recordings of the media programs are captured (e.g., twenty-four hours after the recordings are captured) by NDVR facility 408 and ending after a predefined period of time (e.g., after two weeks of being available as VOD content 418).

In certain examples, additionally or alternatively to network recordings of live media programs, VOD content 418 may provide on-demand media programs that do not arise out of scheduled transmissions of live media programs. That is, VOD content 418 may include on-demand content other than network recordings of live media programs.

Figure 5:
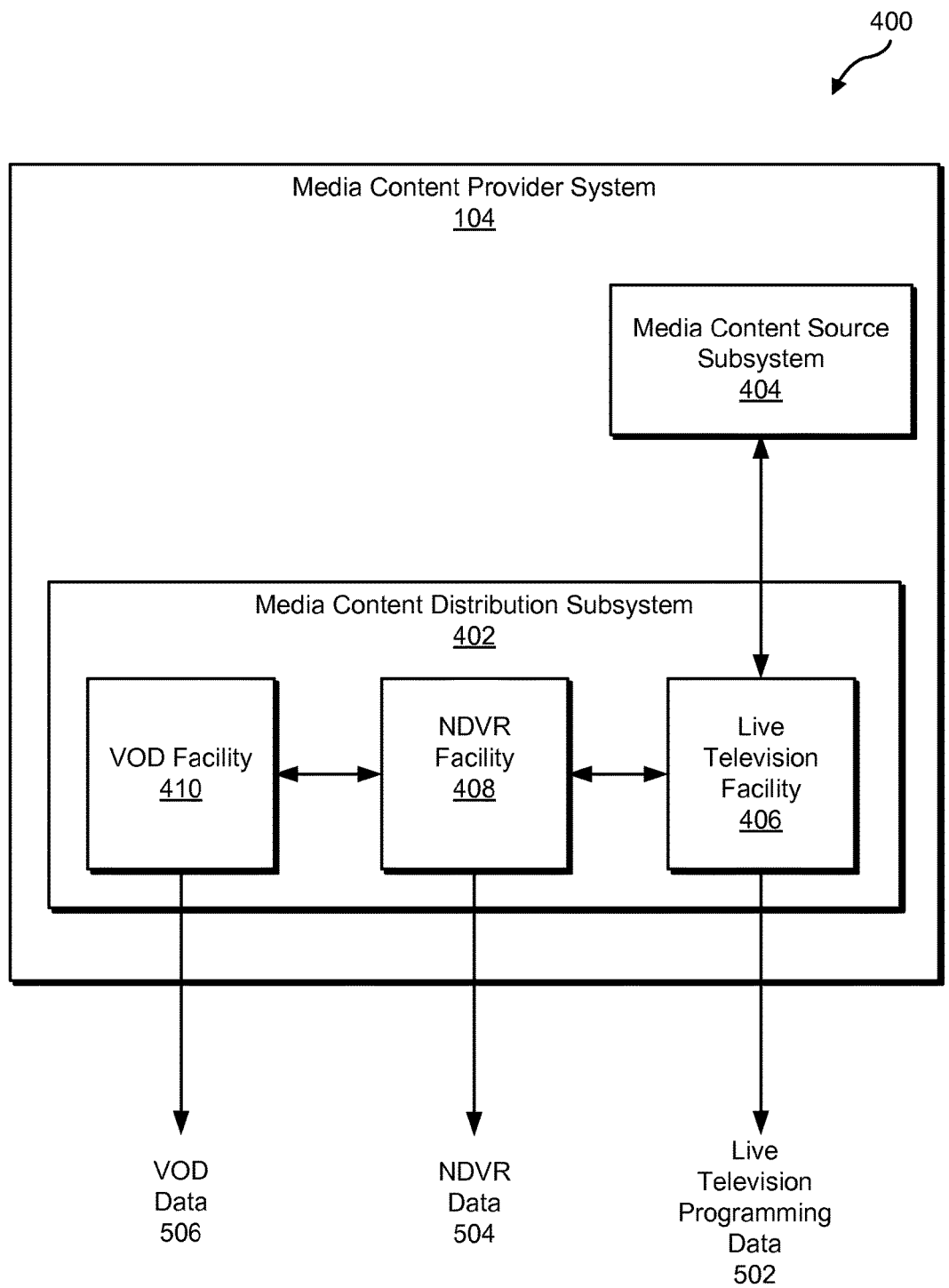

In addition to providing media content (e.g., live television content 412 and VOD content 418) to access system 102, media content distribution subsystem 402 may be further configured to provide data associated with the media content and/or one or more services provided by media content distribution subsystem 402. For example, FIG. 5 illustrates media content distribution subsystem 402 providing live television programming data 502, NDVR data 504, and VOD data 506 for access by access system 102.

Live television programming data 520 may include any information about the distribution of live television content 412, including information helpful to access system 102 and/or a user of access system 102 to locate and access live television content 412. For example, live television programming data 502 may include electronic media program data configured to be used by access system 102 to generate and provide an interactive media program guide user interface to a user.

NDVR data 504 may include any information about the recording of live media programs by NDVR facility 408. For example, NDVR data 504 may specify live media programs that are designated for automatic recording by NDVR facility 408. To illustrate, a content provider such as NBC may agree to allow media content distribution subsystem 402 to record certain media programs provided by NBC and to make the recorded media programs available as VOD content 418. NDVR data 504 may specify those media programs and/or information about the scheduled transmissions of those media programs (e.g., the channel and/or time slots for transmission of the media programs). In addition, NDVR data 504 may include any data that may be useful to NDVR facility 408 to perform network recording operations.

VOD data 506 may include any information about media programs that VOD facility 410 is configured to provide as VOD content 418, including information about recorded media programs that are available from VOD facility 410 on-demand.

Access system 102 may be configured to access live television content 412, VOD content 418, live television programming data 502, NDVR data 504, and/or VOD data 506 provided by media content distribution subsystem 402. Access system 102 may be configured to use the live television programming data 502, NDVR data 504, and/or VOD data 506 to generate and provide one or more user interfaces configured to facilitate user access to media programs (live television content 412 and/or the VOD content 418) distributed by media content distribution subsystem 402. Through the user interfaces, the user may locate and access media programs that are of interest to the user.

In certain examples, access system 102 may be configured to provide a media program guide user interface through which a user of access system 102 may access information about a transmission schedule of live media programs (e.g., television programming information). Access system 102 may be configured to provide one or more enhancements in the media program guide user interface that are configured to be used by the user to access information about NDVR operations and/or about VOD content 418 that is available or will become available to access system 102.

Figure 6:
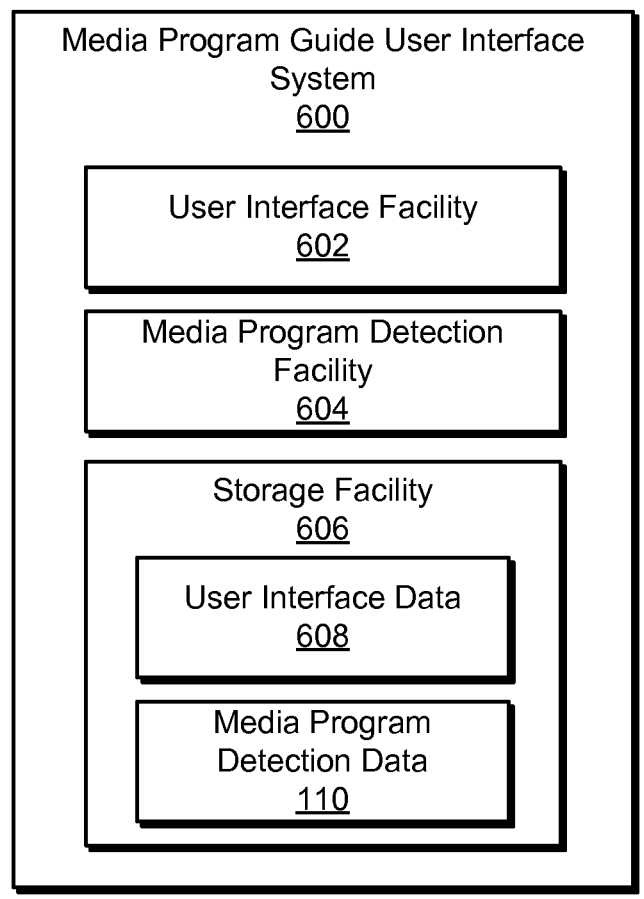
FIG. 6 illustrates an exemplary media program guide user interface system according to principles described herein.

FIG. 6 illustrates an exemplary media program guide user interface system 600 ("system 600") configured to provide one or more user interfaces for use by a user to interact with access system 102 and/or media content provider system 104. As shown, system 600 may include, without limitation, a user interface facility, a media program detection facility 604 ("detection facility 604"), and a storage facility 606 selectively and communicatively coupled to one another. Any suitable communication technologies, including any of the communication technologies mentioned herein, may be employed to facilitate communications between facilities 602-606. It will be recognized that although facilities 602-606 are shown to be separate facilities in FIG. 6, any of facilities 602-606 may be combined into fewer facilities, such as into a single facility, or divided into more facilities as may serve a particular implementation.

System 600 may be implemented by any suitable combination of computing devices and/or systems. For example, facilities 602-606 of system 600 may be implemented entirely by access system 102, entirely by media content provider system 104, and/or by any other device and/or system. Alternatively, facilities 602-606 of system 600 may be distributed across any combination of these systems and/or devices. Each of these facilities will now be described in more detail.

Storage facility 606 may be configured to store user interface data 608 generated and/or used by user interface facility 602 and media program detection data 610 generated and/or used by detection facility 604. User interface data 608 may include any data used to generate a user interface provided by user interface facility 602, such as described herein. Media program detection data 610 may include any data used by detection facility 602 to detect associations between content of a user interface and one or more media programs, such as described herein. Storage facility 606 may maintain additional or alternative data as may serve a particular implementation.

User interface facility 602 may be configured to perform one or more of the user interface operations described herein, including providing output to and/or receiving input from a user. For example, user interface facility 602 may be configured to provide output by generating and providing one or more user interfaces (e.g., graphical user interfaces ("GUIs")) configured to facilitate user access to media content and/or information about the media content. For instance, user interface facility 602 may provide an interactive media program guide user interface (e.g., an interactive media program guide GUI), which may include one or more views of an interactive media program guide. Examples of such user interfaces and user interface views (e.g., GUIs and GUI views) are described herein.

User interface facility 602 may be further configured to receive user input from a user of access system 102. The input may be provided by the user and received by user interface facility 602 in any suitable way, including through any of the user interfaces provided by user interface facility 602.

User interface facility 602 may be configured to access and use data (which may be included in user interface data 608 stored by storage facility 606) to generate a user interface. For example, user interface facility 602 may be configured to access data provided by media content provider system 104 (e.g., live television programming data 502, NDVR data 504, and/or VOD data 506) and to use the data to populate a user interface such as a media program guide user interface configured to be used by a user of access system 102 to browse a media transmission schedule (e.g., a live television programming schedule) and select media programs to be presented and/or recorded by access system 102.

Exemplary views of a media program guide user interface that may be provided by user interface facility 602 will now be described.

Figure 7:
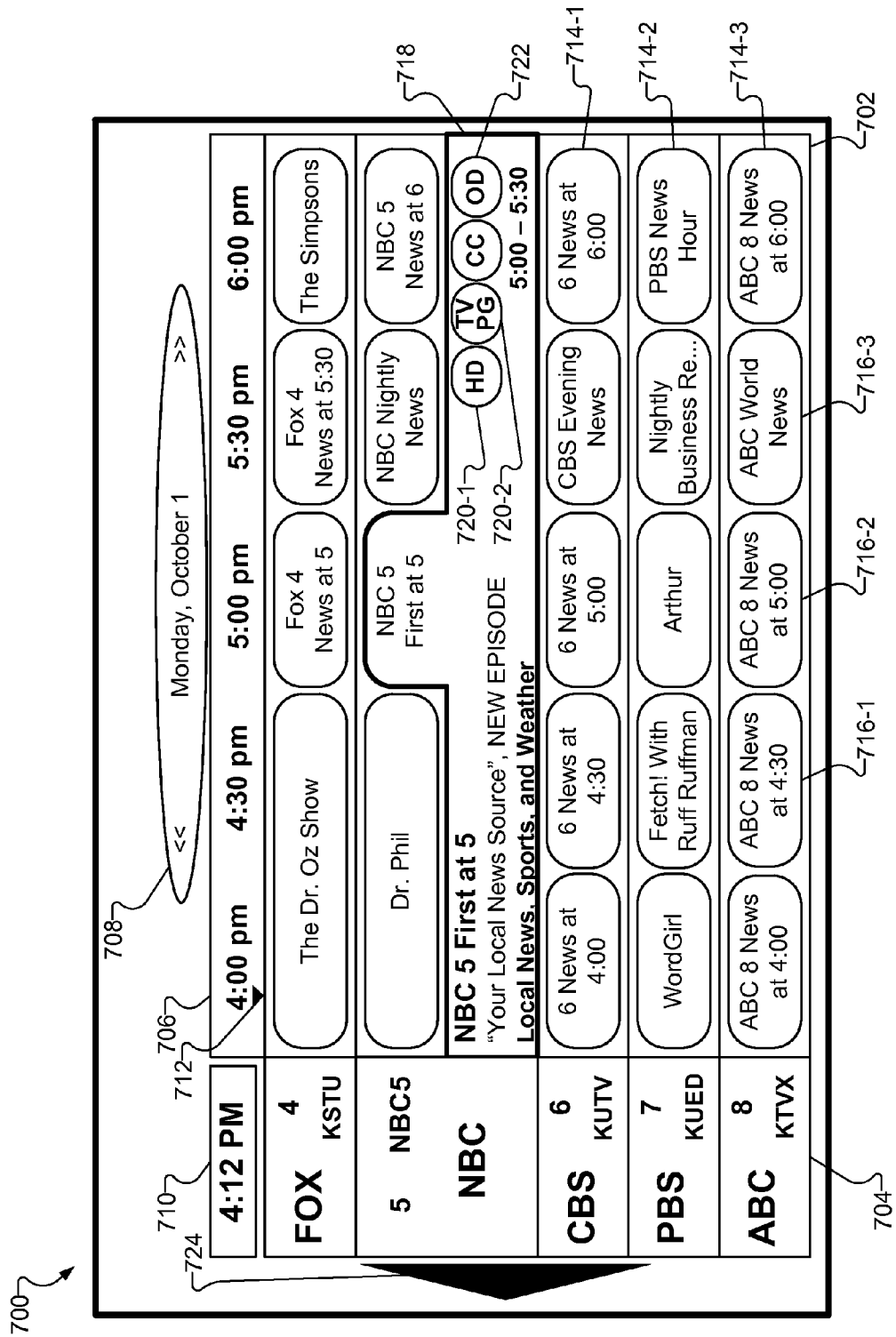
FIGS. 7-8 illustrate examples of a forward-looking view of a media program guide according to principles described herein.

FIG. 7 illustrates an exemplary forward-looking view 700 of a media program guide that may be displayed on a display screen by user interface facility 602. As shown in FIG. 7, forward-looking view 700 may comprise a matrix grid 702 of cells arranged relative to a channel axis 704 and a time axis 706. Current information (e.g., a current date and/or current time) may also be displayed in forward-looking view 700, as illustrated by date indicator 708 and time indicator 710. Additionally or alternatively, a time cursor 712 may be configured to move along time axis 706 to indicate the current time.

Matrix grid 702 may contain one or more cells representing media programs scheduled for transmission in accordance with a transmission schedule. As shown, the media programs represented in the one or more cells may be scheduled to be shown on media channels (e.g., FOX, ABC, etc.) arranged along channel axis 704 and at times arranged along time axis 706. For example, cells 714-1, 714-2, and 714-3 (collectively "cells 714") represent media programs titled "6 News at 6:00," "PBS News Hour," and "ABC 8 News at 6," respectively. Cells 714 are aligned with one another relative to time axis 706 because each of the media programs represented by the cells 714 is scheduled for transmission at the same time, 6:00 PM. Because the media programs represented by cells 714 are scheduled to be transmitted on different channels (i.e., CBS, PBS, and ABC, respectively), the cells are staggered (i.e., arranged) relative to channel axis 704. Conversely, cells 716-1, 716-2, and 716-3 represent media programs titled "ABC 8 News at 4:30," "ABC 8 News at 5:00," and "ABC World News," respectively, which media programs are scheduled to be shown at different times (i.e. 4:30, 5:00, and 5:30, respectively) on the same channel (i.e. ABC).

Matrix grid 702 may be scrollable by the user within forward-looking view 700. For example, scrolling along the channel axis (e.g., scrolling up and down) may cause some channels presently represented on channel axis 704 to no longer be represented in the forward-looking view (e.g., to scroll off screen) while other channels not presently represented come into view. A similar effect may occur when a user scrolls left and/or right along the time axis 706.

A cell may be selected within forward-looking view 700. The cell may be selected in any suitable way. As an example, a selector 718 may be automatically positioned at a particular cell upon launch of forward-looking view 700. As another example, a user may provide input to navigate the selector 718 to a cell to highlight the cell with selector 718.

In some implementations, a cell highlighted with the selector 718 may be expanded such that additional content related to the cell (additional information about the media program represented by the cell) may be displayed in forward-looking view 700. To illustrate, when the cell representing a media program titled "NBC 5 First at 5" is highlighted with the selector 718, the cell is made visually prominent in forward-looking view 700 (e.g., by being emboldened and expanded to fill an entire row of matrix grid 702 in forward-looking view 700) and additional information associated with the media program represented by the cell is displayed.

For example, as shown in highlighted cell 718, metadata describing the media program represented by the cell may be displayed as part of the highlighting selection. Metadata may include a full name of the media program, a description of the media program, a description of a particular episode of the media program scheduled for transmission, icons indicating various features of the media program ("feature icons"), and/or any other metadata suitable to a particular implementation. Some examples of feature icons are illustrated in highlighted cell 718 by feature icons 720 (e.g., 720-1 and 720-2), and by "OD" feature icon 722. Feature icon 720-1 indicates that the media program will be available in high definition ("HD"). Feature icon 720-2 indicates that the associated media program has a parental content rating of "TV-PG." "OD" feature icon 722 indicates that the associated media program is designated for automatic recording by NDVR facility 408 at the time the media program is scheduled for transmission and that the network recording of the media program will become accessible on-demand ("OD") to access system 102. The "OD" feature icon 722 is described in more detail herein.

As another example of cell selection, a user may provide input to select a highlighted cell to access the media program represented by the cell. For example, with a cell highlighted by the selector 718, the user may provide user input to direct access system 102 to present or record the media program represented by the cell.

As a user scrolls along an axis of matrix grid 702 and/or selects cells and/or other items within the forward-looking view 700 of the media program guide, the content of the forward-looking view 700 may change. As used herein, "content" of the forward-looking view 700 may refer to channels, times, cells, media programs, metadata, user selections (e.g., a user selected cell or channel), and/or any other content represented within a display of the forward-looking view 700 of the media program guide at a current moment in time. Data representing the content of the forward-looking view 700 may be determined, stored, updated, and/or tracked in real time by user interface facility 602 and may be included in user interface data 608.

As shown in FIG. 7, the forward-looking view 700 of the media program guide includes content (e.g., cells, channels, time slots, and metadata) associated with current and future scheduled transmissions of live media programs. In addition, forward-looking view 700 may include one or more indicators and or information associated with availability of other media programs (e.g., non-live media programs such as VOD content 418). Such indicators and/or information may be dynamically presented together with the forward-looking view 700 based on content of the forward-looking view 700 (e.g., based on one or more associations of the other media programs with the current content of the forward-looking view 700 of the media program guide. Accordingly, within the context of the forward-looking view 700, a user may view indicators and/or information associated with non-live media programs, without having to navigate away from the forward-looking view 700.

To this end, detection facility 604 illustrated in FIG. 6 may be configured to detect associations between content of a forward-looking view of a media program guide (e.g., content associated with scheduled transmissions of live media programs represented in forward-looking view 700) and one or more non-live media programs available for access by access system 102, such as recorded and/or other media programs included in VOD content 418. In certain examples, detection facility 604 may be configured to detect an association between content of a forward-looking view of a media program guide and a recorded media program that has been recorded by NDVR facility 408 or a local DVR device within access system 102.

Detection facility 604 may be configured to detect particular associations between content of a forward-looking view and non-live media programs that are available for access by access system 102. To this end, in certain examples, detection facility 604 may use user interface data 608 to identify content of a forward-looking view, VOD data 506 to identify non-live media programs available from VOD facility 418, and local DVR device data to identify non-live media programs available from a local DVR device. Such data may be compared by detection facility 604 to identify associations between content of a forward-looking view and non-live media programs that are available for access by access system 102. Examples of such associations will now be described.

In certain examples, detection facility 604 may be configured to detect an association between any content displayed in a forward-looking view and a non-live media program that is available to access system 102. For example, detection facility 604 may be configured to detect an association between a non-live media program and any channel displayed along channel axis 704 and/or any media program represented by any cell displayed within matrix grid 702 in forward-looking view 700.

To illustrate, detection facility 604 may identify a channel included in the channels arranged along the channel axis 704 in forward-looking view 700 and identify a non-live media program that is available to access system 102 and that is associated with the channel. For example, detection facility 604 may identify a recorded media program included in VOD content 418 that is a recording of a past transmission (i.e., a scheduled transmission prior in time to the current and future scheduled transmissions represented in forward-looking view 700) of the media program on the same channel.

To illustrate another example, detection facility 604 may identify a media program represented by a cell in the matrix grid 702 of cells in forward-looking view 700 and identify a non-live media program that is available to access system 102 and that is associated with the identified media program. For example, detection facility 604 may identify a recorded media program included in VOD content 418 that is a recording of a past transmission of the same media program, another episode of the media program, or another media program that is related or similar to the media program (e.g., a media program that is a spin-off of or recommended to viewers of the media program).

In certain examples, detection facility 604 may be configured to detect an association between any content that is currently selected in a forward-looking view and a non-live media program that is available to access system 102. For example, detection facility 604 may be configured to detect an association between a non-live media program and any channel or cell selected within forward-looking view 700. To illustrate, in FIG. 7 selector 718 represents a selection of a cell that represents a media program titled "NBC 5 First at 5" that is scheduled for transmission on a channel labeled "NBC 5" at a 5:00 PM-5:30 PM time slot. When selector 718 is in this position, detection facility 604 may search for and detect any non-live media programs associated with the channel (e.g., the "NBC 5" channel) or the media program (e.g., the "NBD 5 First at 5" media program) selected by selector 718.

To illustrate, detection facility 604 may identify a channel selected in forward-looking view 700. For example, detection facility 604 may identify a cell selected by selector 718 in forward-looking view 700 and identify a channel that corresponds to the selected cell. Detection facility 604 may then identify a non-live media program that is available to access system 102 and that is associated with the selected channel. For example, detection facility 604 may identify a recorded media program included in VOD content 418 that is a recording of a past transmission of the media program on the same channel.

To illustrate another example, detection facility 604 may identify a media program selected in forward-looking view 700. For example, detection facility 604 may identify a cell selected by selector 718 in forward-looking view 700 and identify a media program represented by the selected cell. Detection facility 604 may then identify a non-live media program that is available to access system 102 and that is associated with the selected media program. For example, detection facility 604 may identify a recorded media program included in VOD content 418 that is a recording of a past transmission of the same media program, another episode of the media program, or another media program that is related or similar to the media program.

In response to detection facility 604 detecting an association between content of a forward-looking view of a media program guide and one or more non-live media programs that are available for access by access system 102, detection facility 604 may direct user interface facility 102 to present, together with the forward-looking view of the media program guide, a selectable option configured to inform a user of access system 102 that one or more non-live media programs that are related to content of the forward-looking view 700 are available for access by access system 102. The selectable option may be configured to be selected by the user to trigger a display of a backward-looking view of the media program guide.

FIG. 7 illustrates an example of such a selectable option 724 displayed together with forward-looking view 700. In the illustrated example, selectable option 724 is in the form of an arrow icon pointing backward in time along the time axis 706 of forward-looking view 700. Selectable option 724 may be displayed in response to a detection of any of the associations of one or more available non-live media programs to content of forward-looking view 700 described herein. Other visual icons may be used to represent selectable option 724 in other examples.

Figure 8:
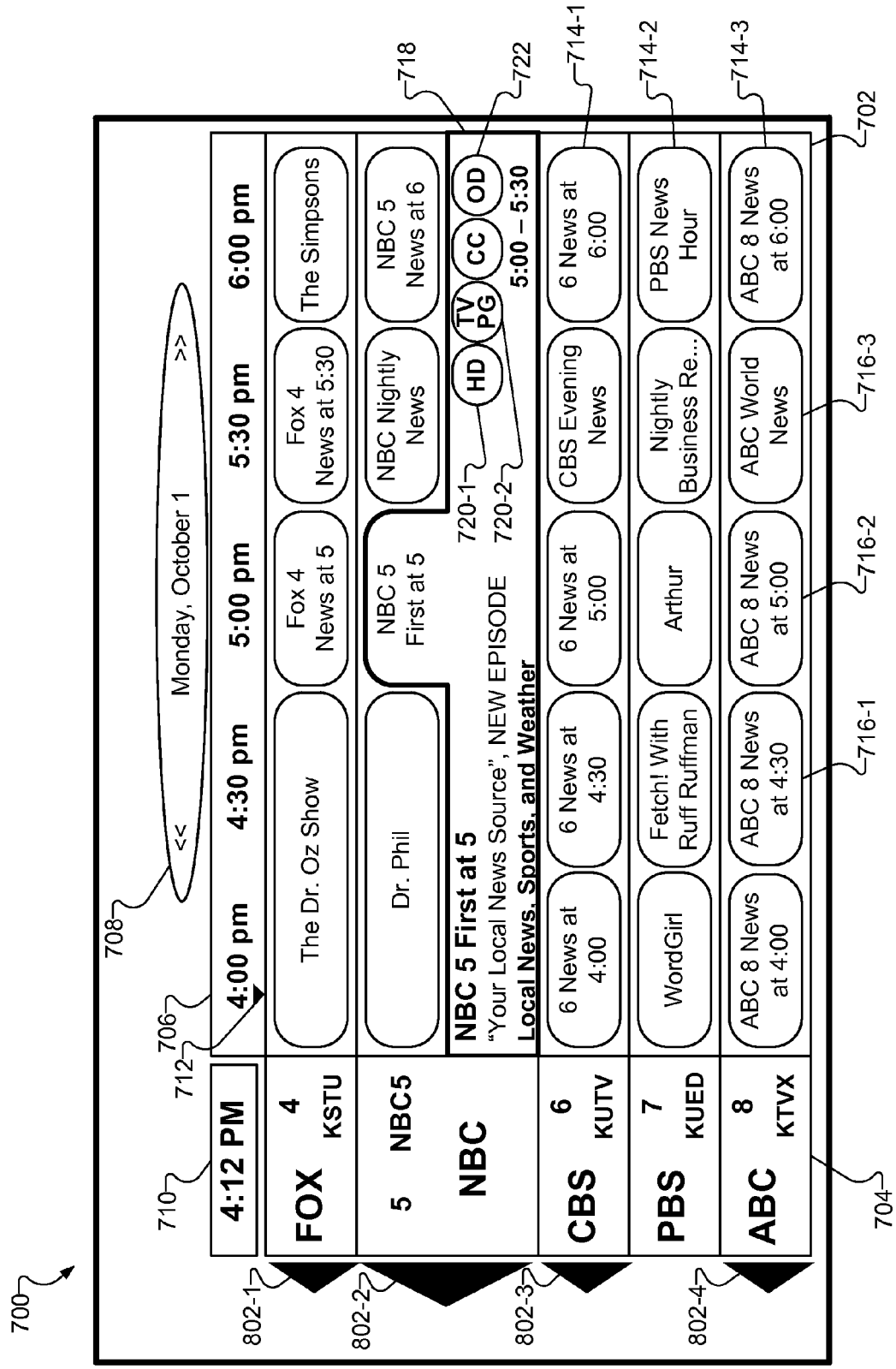

To illustrate another example, FIG. 8 shows a plurality of selectable options 802 (e.g., selectable options 802-1 through 802-4) displayed together with forward-looking view 700. Selectable options 802 may be similar to selectable option 724 and may also be channel specific. For example, selectable option 802-1 may be displayed in response to a detection of any of the associations of one or more available non-live media programs to the "FOX 4" channel represented in forward-looking view 700 (e.g., to the channel itself or to any of the media programs represented by cells in the "FOX 4" channel row in forward-looking view 700). If no association is found between a channel and an available non-live media program, user interface facility 602 may not display a selectable option for that channel. Such is the case for the "PBS 7" channel in FIG. 8.

With a selectable option, such as any of selectable options 724 and 802, presented in the forward-looking view 700, user interface facility 602 may detect a selection by a user of the selectable option. This selection may be made in any suitable way, such as by a user moving selector 718 and/or pressing a designated button on a remote control and/or with a tap or touch gesture on a touch screen. In response to the user selection of the selectable option, user interface facility 602 may display a backward-looking view of the media program guide.

Figure 9:
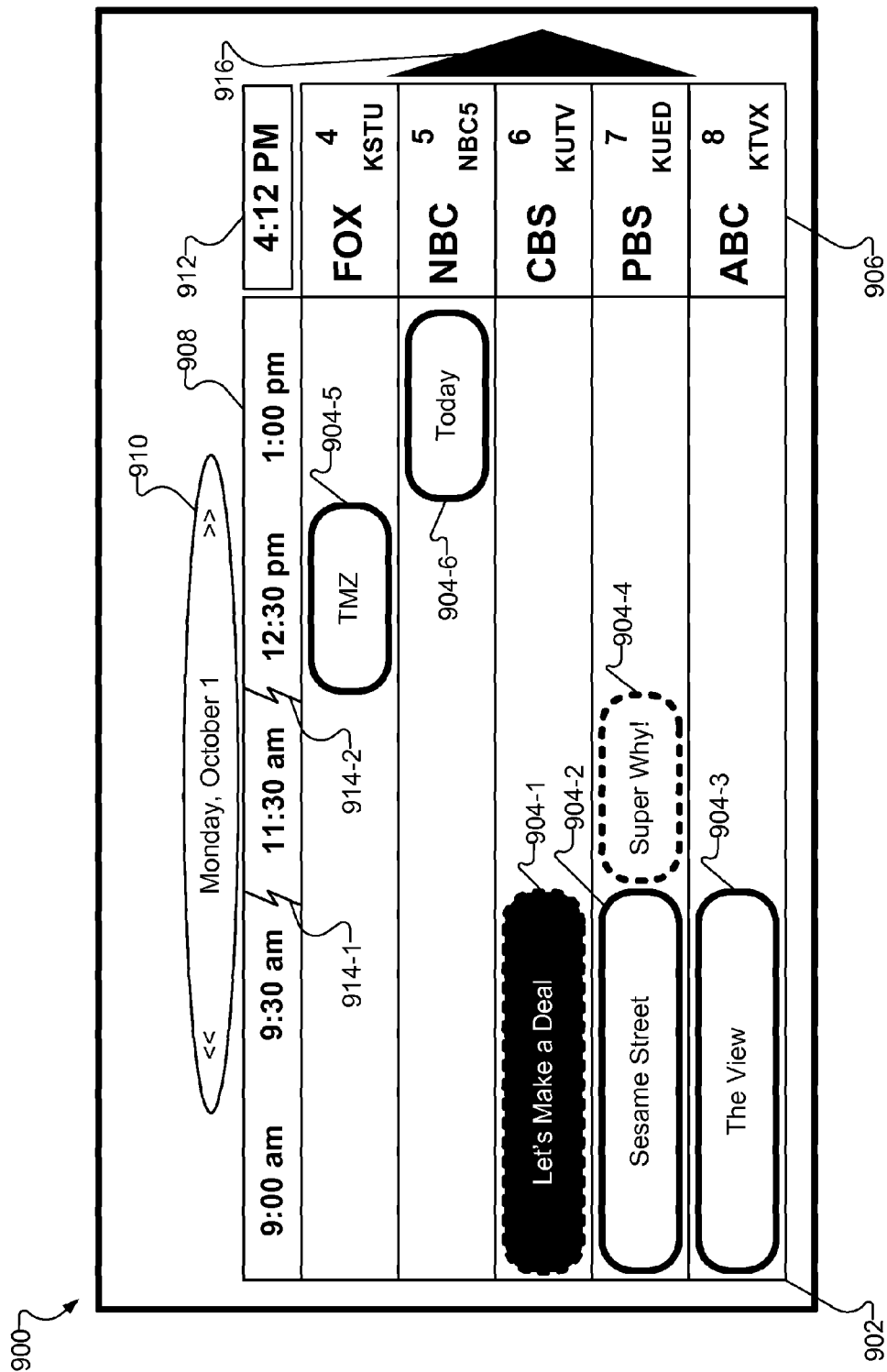
FIGS. 9-12 illustrate exemplary backward-looking views of a media program guide according to principles described herein.

FIG. 9 illustrates an exemplary backward-looking view 900 of a media program guide. As illustrated, backward-looking view 900 may comprise a backward-looking matrix grid 902 of cells 904 (e.g., 904-1 through 904-6) arranged relative to a backward-looking channel axis 906 and a backward-looking time axis 908. Cells 904 may represent a set of non-live media programs available to access system 102 and detected by detection facility 604 to have an association with the content of the forward-looking view 700. In certain examples, for instance, cells 904 may represent a set of recorded media programs that includes one or more recorded media programs detected by detection facility 604 to have an association with the content of the forward-looking view 700. The recorded media programs represented by cells 904 may be captured by NDVR facility 408 and/or a local DVR device within access system 102 from past transmissions on one or more channels arranged along backward-looking channel axis 906 at one or more times arranged along backward-looking time axis 908. In like manner with the forward-looking view 900, a date indicator 910 and a time indicator 912 may also be displayed as part of the backward-looking view 900 of the media program guide.

A set of recorded media programs represented by a backward-looking view of a media program guide may include recordings of the media programs captured by NDVR facility 408 and stored by VOD facility 410 for distribution as VOD content 418. Additionally or alternatively, the set of recorded media programs represented by the backward-looking view of the media program guide may include recordings of the media programs captured by a local DVR device and stored within access system 102. Thus, in some examples, recorded media programs stored on a local DVR device may be represented together with recorded media programs stored by VOD facility 410 in the backward-looking view 900.

To illustrate, FIG. 9 shows cells 904-2, 904-3, 904-5, and 904-6 having solid borders to visually indicate that cells 904-2, 904-3, 904-5, and 904-6 represent recorded media programs available on a local DVR device within access system 102. In addition, FIG. 9 shows cells 904-1 and 904-4 having dashed borders to visually indicate that cells 904-1 and 904-4 represent recorded media programs recorded by NDVR facility 408 and made available to access system 102 by VOD facility 410.

By providing the user with information about and/or access to recorded media programs from multiple sources (e.g., a local DVR device and VOD facility 408) through backward-looking view 900, system 600 may allow the user to access and experience media programs from various sources in one unified user interface. The unified user interface may simplify the tasks of finding and selecting a media program to experience and may make a user of access system 102 more aware of available media content options. These benefits may prove particularly advantageous to users who are unfamiliar and/or dissatisfied with typical user interfaces and/or to users who do not typically look beyond one preferred source (e.g., a DVR device) to other sources (e.g., a VOD service that includes NDVR recordings of live media programs) for available media programs. In these ways and others, the user interfaces described herein may simplify and improve the experience of a user in finding and/or accessing various media content options.

A backward-looking view of a media program guide may be configured as may suit a particular implementation. In certain examples, for instance, the times arranged along the backward-looking time axis 908 of backward-looking view 900 may form a discontinuous timeline comprising only programming time slots to which the cells 904 included in the backward-looking matrix grid 902 of cells 904 correspond. To illustrate, perhaps no transmission of any media program on the channels represented in backward-looking view 900 (i.e. FOX, NBC, CBS, PBS, and ABC) was recorded between 10:00 AM and 11:30 AM. To maintain a continuous timeline (i.e. one in which every time is given equal representation) in this case would require an empty segment stretching an hour and a half along backward-looking time axis 908 to be represented on backward-looking matrix grid 902. Such an empty segment may be inconvenient to a user who gains little benefit from the continuity of the timeline but is forced to scroll on the matrix grid 902 past this empty segment in order to find available recorded media programs. This problem would only be compounded by other empty segments along a continuous timeline, especially any which lasted for longer periods of time (e.g., hours or days).

Accordingly, user interface facility 602 may be configured to arrange the times along backward-looking time axis 908 so as to form a discontinuous timeline which eliminates such empty segments. In certain examples, discontinuity indicators 914 (e.g., discontinuity indicators 914-1 or 914-2) may be displayed in backward-looking view 900 to represent time segments omitted from a timeline along backward-looking time axis 908. In FIG. 9, discontinuity indicator 914-1 indicates that no recorded media program is available on any channel represented in backward-looking view 900 from 10:00 AM until 11:30 AM, and discontinuity indicator 914-2 indicates a similar absence of recorded media programs on the channels from 12:00 PM until 12:30 PM.

In certain examples, a forward-looking view and a corresponding backward-looking view of a media program guide may represent a timeline that spans both views. For example, forward-looking view 700 shown in FIG. 7 may represent the current time toward a left edge of matrix grid 702, and backward-looking channel axis 906 shown in FIG. 9 may represent the current time toward a right edge of backward-looking matrix grid 902. Additionally, backward-looking time axis 908 may be horizontally oriented and may meet backward-looking channel axis 906 at an intersection proximate the right edge of backward-looking matrix grid 902. Times arranged along backward-looking time axis 908 may proceed backward in time (i.e., into the past) moving away from the intersection and toward a left edge of backward-looking matrix grid 902. These features of the matrix grid layout may serve to make the backward-looking view 900 of the media program guide intuitive, useful, and/or convenient for users familiar with using the matrix grid layout of forward-looking view 700. One reason for this may be because of uniformities between the backward-looking view and the forward-looking view. For example, backward-looking channel axis 906 may have the same content and arrangement as the channel axis 704 in forward-looking view 700. As another example, navigation along forward-looking time axis 706 in forward-looking view 700 and backward-looking time axis 908 may be consistent across the views.

User interface facility 602 may be configured to allow a user to navigate a backward-looking view of the media program guide and select cells within it in a similar manner as is allowed in a forward-looking view of the media program guide. For example, a user may select a cell in backward-looking view 900 in any of the ways described herein in reference to forward-looking view 700. While information (e.g., metadata) analogous to that shown in highlighted cell 718 in forward-looking view 700 in FIG. 7 may be similarly shown for a highlighted cell in backward-looking view 900 (not illustrated), backward-looking view 900 shown in FIG. 9 illustrates a simplified selection scheme. In the illustrated example, cell 904-1 is selected and distinguished from other cells via a white-on-black text scheme instead of the black-on-white text scheme employed by the unselected cells 904-2 through 904-6.

As a user navigates the backward-looking view 900 and selects a cell 904 in the ways described above, system 600 may detect a user selection of a recorded media program represented by the selected cell and, in response, may facilitate a presentation of the selected recorded media program. This facilitating may include any steps as may be appropriate for a particular selection and implementation of system 600. For example, if system 600 detects a user selection a recorded media program available to access system 102 from VOD facility 410, system 600 may direct access system 102 to request a stream of the recorded media program from VOD facility 410 for playback by access system 102. In like manner, if system 600 detects a user selection a recorded media program available locally within access system 102 (from a DVR device in access system 102), system 600 may direct access system 102 to initiate a playback of the locally stored recording of the media program by access system 102. In certain examples, user interface facility 602 may be configured to initiate access and playback of a media program selected in backward-looking view 900 in response to the selection of the media program in backward-looking view 900 and without additional user input.

In certain examples, user interface facility 602 may provide a selectable option configured to be selected by a user to trigger a return to a display of forward-looking view 700. To illustrate, FIG. 9 shows a selectable option 916 displayed together with backward-looking view 900. Selectable option 916 may be configured to be selected by a user to trigger a return to a display of forward-looking view 700. Accordingly, a user may select selectable option 724 (or any of selectable options 802) and selectable option 916 to switch (e.g., toggle) a display between forward-looking view 700 and backward-looking view 900.

Figure 10:
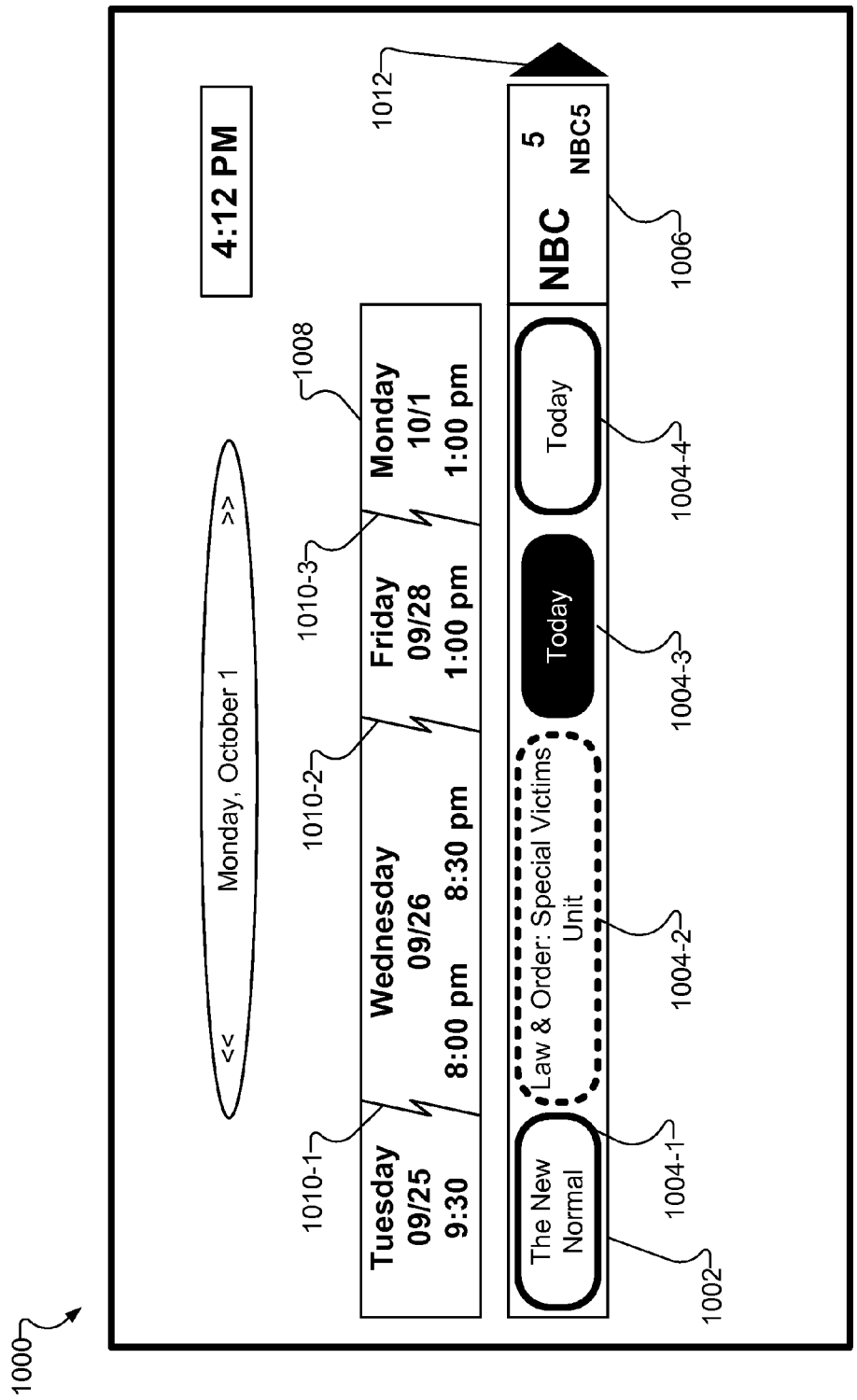

FIG. 10 illustrates another exemplary backward-looking view 1000 of a media program guide. As shown, backward-looking view 1000 may include a matrix grid 1002 of cells 1004 (e.g., cells 1004-1 through 1004-4) arranged relative to backward-looking channel axis 1006 and a backward-looking time axis 1008. In the illustrated example, the matrix grid 1002 includes only a single channel row (e.g., for the "NBC 5" channel) that includes cells 804 arranged to correspond to different time slots along time axis 1008.

In backward-looking view 1000, cells 1004 may be visually represented (e.g., by solid or dashed borders) to indicate sources of the media programs represented by the cells 1004, such as described herein. A selected cell 1004-3 may also be visually distinguished from unselected cells 1004-1, 1004-2, and 1004-4, such as described herein. Discontinuity indicators 1010 (e.g., discontinuity indicators 1010-1 through 1010-3) may also be displayed to indicate segments of time omitted from a discontinuous timeline represented along backward-looking time axis 1008. User interface facility 602 may display a selectable option 1012 together with the backward-looking view 1000 and configured to be selected by a user to trigger a display of a forward-looking view of the media program guide.

Backward-looking view 1000 may be displayed in response to a user selection of any of selectable options 724 and 802 as described above. In some examples, backward-looking view 1000 may be displayed when the "NBC 5" channel is the only channel (e.g., the only channel of the channels represented in forward-looking view 700) for which an association with one or more available non-live media programs has been detected by detection facility 604. In some examples, backward-looking view 1000 may be displayed in response to a user selection of selectable option 802-2 that is specific to the "NBC 5" channel as shown in FIG. 8.

Because the matrix grid 1002 includes only a single channel row in backward-looking view 1000, the matrix grid 1002 may be more compressed along a discontinuous timeline than is possible for matrix grids in other backward-looking views that represent non-live media programs for multiple channels. For example, a single-channel matrix grid such as that shown in FIG. 10 allows all empty time slots to be omitted from the matrix grid.

Figure 11:
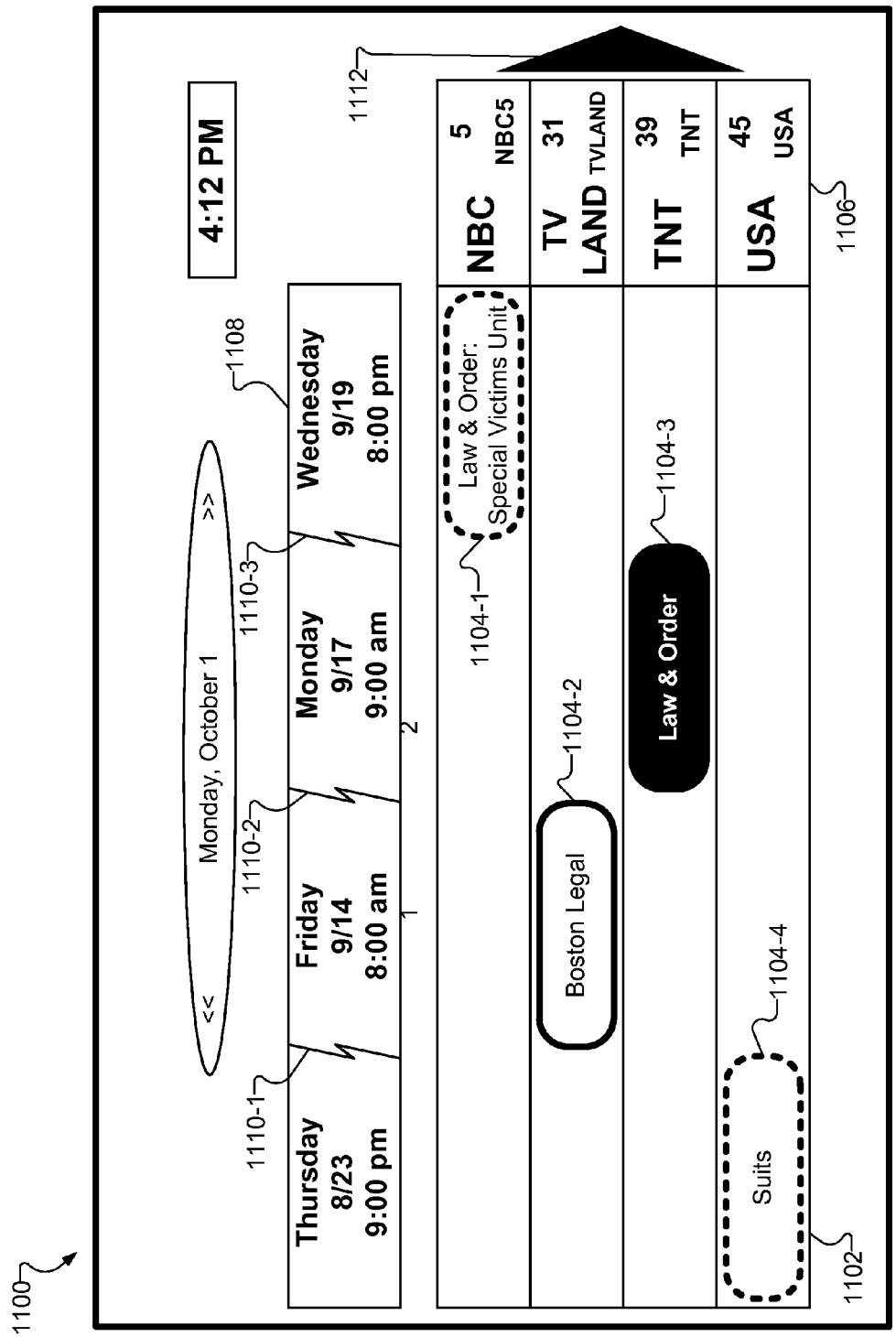

FIG. 11 illustrates another exemplary backward-looking view 1100 of a media program guide. As shown, backward-looking view 1100 may include a matrix grid 1102 of cells 1104 (e.g., cells 1104-1 through 1104-4) arranged relative to backward-looking channel axis 1106 and a backward-looking time axis 1108. In backward-looking view 1100, cells 1104 may be visually represented (e.g., by solid or dashed borders) to indicate sources of the media programs represented by the cells 1104, such as described herein. A selected cell 1104-3 may also be visually distinguished from unselected cells 1104-1, 1104-2, and 1104-4, such as described herein. Discontinuity indicators 1110 (e.g., discontinuity indicators 1110-1 through 1110-3) may also be displayed to indicate segments of time omitted from a discontinuous past-tense timeline represented along backward-looking time axis 1108. User interface facility 602 may display a selectable option 1112 together with the backward-looking view 1100 and configured to be selected by a user to trigger a display of a forward-looking view of the media program guide.

Backward-looking view 1100 may be displayed in response to a user selection of any of selectable options 724 and 802 as described above. In some examples, backward-looking view 1100 may be displayed when non-live media programs represented in backward-looking view 1100 are identified by detection facility 604 as being associated with a particular media program represented in forward-looking view 700, such as a media program represented by a selected cell in forward-looking view 700.

Figure 12:
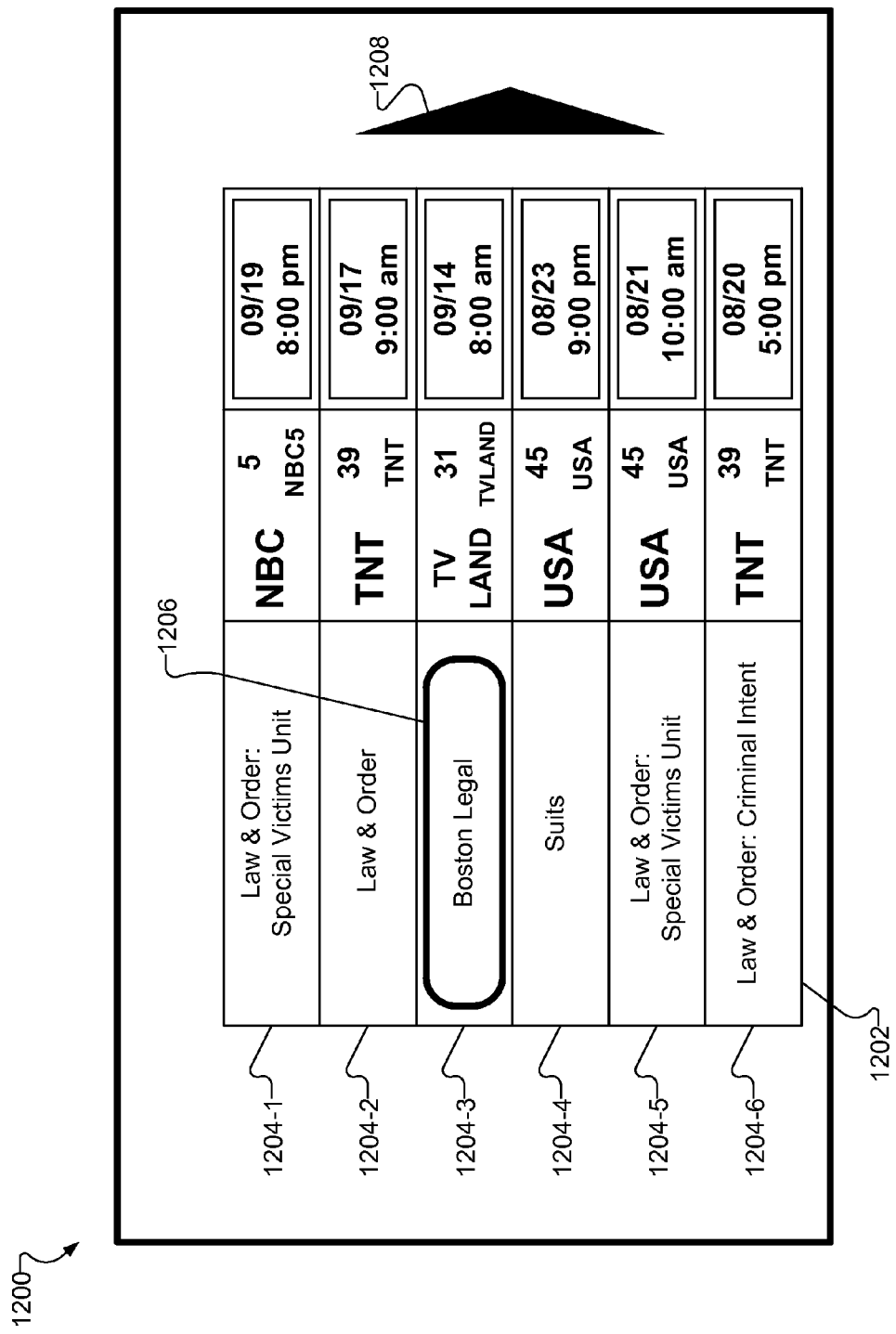

FIG. 12 illustrates another exemplary backward-looking view 1200 of a media program guide. As shown, backward-looking view 1200 may include a list 1202 that includes a number of list items 1204 (e.g., 1204-1 through 1204-6) representing a set of recorded media programs. Each list item 1204 may include a row in a vertical list and may indicate a title of the recorded media program represented by the list item 1204, a channel on which the recorded media program was recorded, and a time at which the recorded media program was recorded. A user may provide input to move a selector 1206 to select a list item 1204. While FIG. 12 does not illustrate visual indicators to indicate sources of the media programs represented in list 1202, such visual indicators may be included as described above. A selection of a list item 1204 may trigger a playback of the recorded media program represented by the list item 1204 and/or a display of additional information and/or one or more options associated with the recorded media program. User interface facility 602 may display a selectable option 1208 together with the backward-looking view 1200 and configured to be selected by a user to trigger a display of a forward-looking view of the media program guide.

The exemplary backward-looking views illustrated in FIGS. 9-12 are illustrative only. Other user interface views may be presented in response to a user selection of any of selectable options 724 and 802 in other examples. For example, any of selectable options 724 and 802 may be configured to trigger a display of a VOD specific user interface associated with a VOD service provided by VOD facility 410 or a DVR specific user interface associated with a local DVR application in access system 102. Such user interfaces may provide information and/or access to recorded media programs that have been determined by detection facility 604 to have an association with content of a forward-looking view of a media program guide. Thus, selectable options 724 and 802 presented together with forward-looking view 700 of a media program guide may function as links to recorded media programs and/or user interfaces that provide information and/or access to recorded media programs that have an association with content of the forward-looking view 700.

In certain examples, any of selectable options 724 and 802 presented together with forward-looking view 700 of a media program guide may function as links to other non-live media programs and/or user interfaces that provide information and/or access to other non-live media programs that have an association with content of the forward-looking view 700. Such other non-live media programs may include on-demand content provided by VOD facility 410 that does not arise from network recording of live transmissions of media programs. For example, VOD facility 410 may acquire on-demand media programs from other sources (i.e., sources other than network recording by NDVR facility 408) and provide those media programs as VOD content 418.

Other non-live media programs may include on-demand content provided by one or more sources other than media content distribution subsystem 402. For example, the other non-live media programs may include on-demand content stored and provided by media content source subsystem 404 for on-demand access by users. To illustrate, a media content provider such as NBC or a third-party VOD service provider may make previously aired television programs available for on-demand access over the Internet. In certain implementations, system 100 may link to such media programs and/or user interfaces provided by a media content provider or other third-party VOD service provider. For instance, detection facility 604 may be configured to identify on-demand media programs offered by a VOD service provider and identify associations between these media programs and content of a forward-looking view of a media program guide. In addition, any of selectable options 724 and 802 may link to such identified media programs and/or to service provider user interfaces. Thus, in this additional manner, any of selectable options 724 and 802 may function as a link to on-demand media programs provided by one or more VOD services and associated with content of a forward-looking view of a media program guide.

Additionally or alternatively to the examples of user interface facility 602 presenting a visual indication together with a forward-looking view of a media program guide to indicate an availability of one or more non-live media programs having as association with content of the forward-looking view of the media program guide as described above, user interface facility 602 may be configured to present a visual indication, together with a forward-looking view of a media content program, that one or more media programs having an association with content of the forward-looking view of the media program guide will become available to access system 102 (e.g., associated non-live media programs are not yet available but are scheduled to become available to access system 102).

To this end, detection facility 604 may be configured to detect associations between content of a forward-looking view and non-live media programs that will become available for access by access system 102, such as media programs that are scheduled for transmission and automatic recording by NDVR facility 408 and will thus become recordings that are available for access from VOD facility 410. In certain examples, detection facility 604 may use user interface data 608 to identify content of a forward-looking view and NDVR data 504 to identify media programs that are designated for automatic recording by NDVR facility 408. Such data may be compared by detection facility 604 to identify associations between content of a forward-looking view and non-live media programs that will become available for access by access system 102. These associations may include associations of media programs designated for automatic recording by NDVR facility 408 with any content (e.g., displayed content and/or selected content) of a forward-looking view of a media content program, such as any of the exemplary associations described herein.

To illustrate, forward-looking view 700 shown in FIG. 7 may include content that represents a media program titled "NBC 5 First at 5" that is scheduled for live transmission on the "NBC 5" channel from 5:00 PM until 5:30 PM. Detection facility 604 may detect that this media program represented in forward-looking view 700 is designated for automatic recording by NDVR facility 408 (e.g., on the same channel and/or at the same time slot).

In response to this detection, user interface facility 602 may present, together with the forward-looking view, a visual indicator that indicates that the live media program represented in the forward-looking will become available to the access system 102 as a non-live media program. More specifically, the visual indicator may indicate that the live media program is scheduled for automatic recording by NDVR facility 408 and that the recording will become available as VOD content 418 for access by the access system 102 (e.g., it will become available a predetermined length of time after the scheduled transmission of the media program).

In some examples, the visual indicator may comprise the "OD" feature icon 722 shown in FIG. 7. Thus, in FIG. 7, the "OD" feature icon 722 may be presented as shown in response to a detection that the "NBC 5 First at 5" media program represented in forward-looking view 700 is designated for automatic recording by NDVR facility 408.

Figure 13:
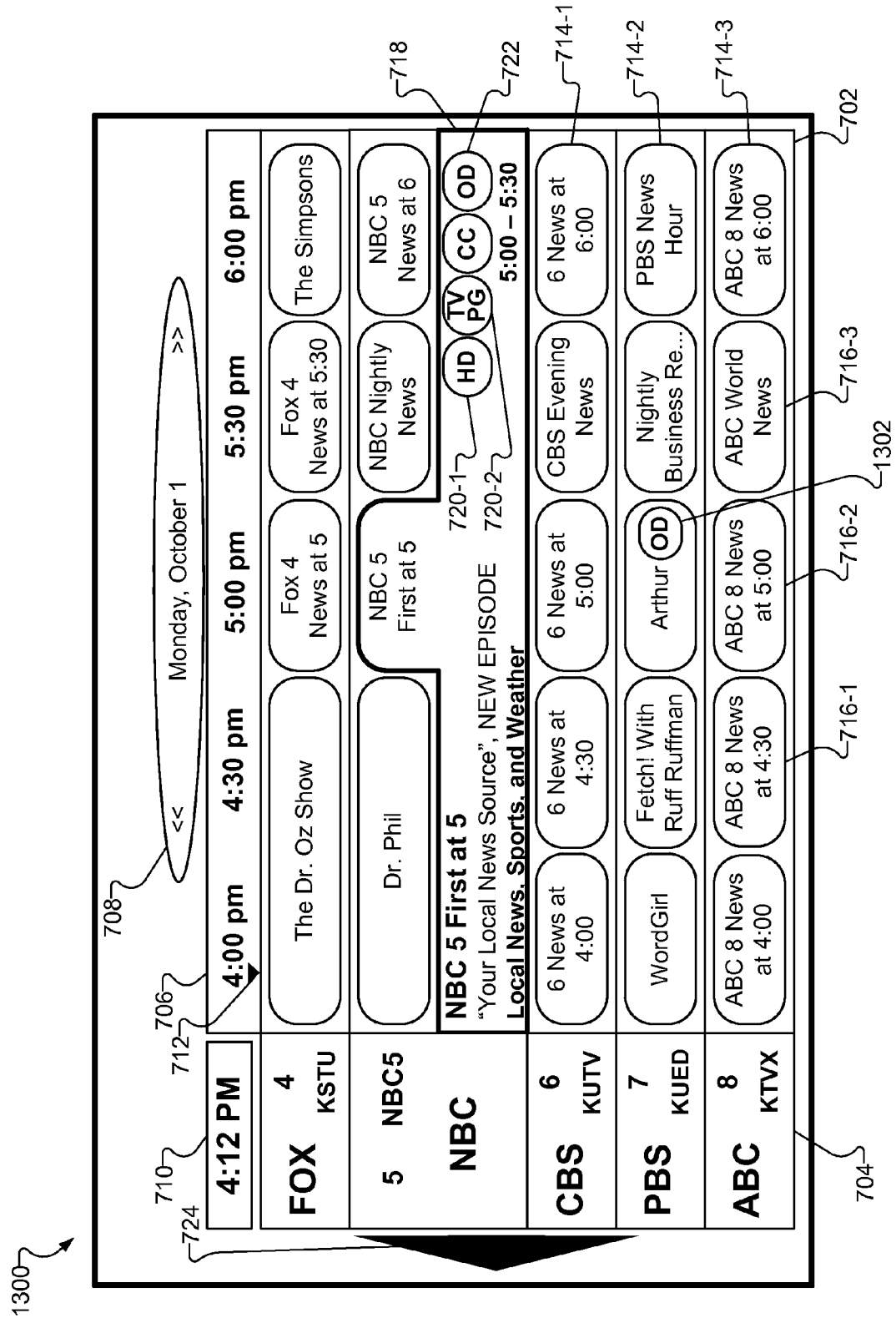
FIG. 13 illustrates another example of a forward-looking view of a media program guide according to principles described herein.

In certain examples, the above-described determination and presentation of the "OD" feature icon 722 may be performed for a media program represented by a selected cell and dynamically in response to the selection of the cell. FIG. 7 illustrates a presentation of the "OD" feature icon 722 within the currently selected cell. In other examples, the above-described determination and presentation of an "OD" feature icon such as icon 722 may be performed for any media program represented in forward-looking view 700 and at any suitable time. The determination and presentation of the icon may be performed for any media programs represented in forward-looking view 700, whether each media program is represented by a selected or a non-selected cell. FIG. 13 illustrates a forward-looking view 1300 that is similar to the forward-looking view 700 of FIG. 7 and further includes an "OD" feature icon 1302 presented within an unselected cell that represents a media program titled "Arthur" to indicate that the "Arthur" media program is designated for automatic recording by NDVR facility 408 and will become available to access system 102.

The above-described determination and presentation of a visual indicator such as an "OD" feature icon may be performed at any suitable time, such as periodically and/or in response to an occurrence of a predefined event (e.g., at a launch of a forward-looking view and/or in response to a selection of a cell).

The presentation of a visual indicator, together with a forward-looking view of a media program guide, may inform a user that a live media program represented in the forward-looking view will become available as a non-live media program. This may help the user to make informed decisions about how to use finite local resources of access system 102, such as local DVR device resources. For example, with such awareness, the user may choose to use the local DVR device to record media programs that are not scheduled for automatic recording by NDVR facility 408 and to access recordings of media programs made by NDVR facility 408 as VOD content from VOD facility 410.

In certain examples, user interface facility 602 may be configured to provide, in response to a detection of a request to record (e.g., a request to record immediately or to schedule a recording) a media program locally with a DVR device within access system 102, a visual notification that the media program is designated for automatic recording by NDVR facility 408 and will become available on-demand to access system 102. To illustrate, while forward-looking view 1300 of FIG. 13 is displayed, a user may provide input to request that the "Arthur" media program represented in the forward-looking view be recorded by a local DVR device. In response, detection facility 604 may detect that the "Arthur" program is designated for automatic recording by NDVR facility 408, and user interface facility 602 may present a visual indicator to indicate this.

Figure 14:
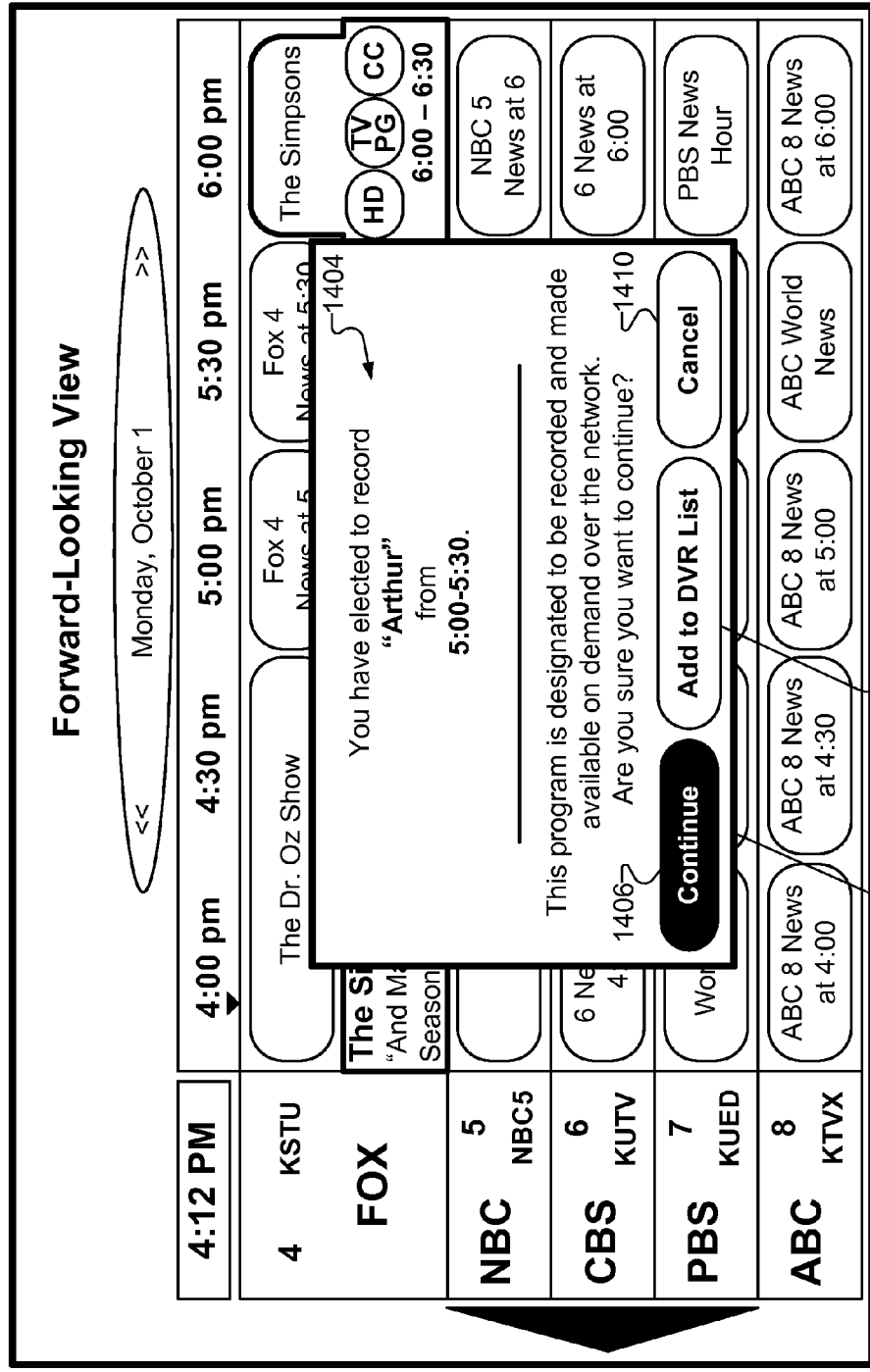
FIG. 14 illustrates an exemplary recording notification window according to principles described herein.

FIG. 14 illustrates an example of such a visual indicator in the form of a recording notification window 1402 overlaid on forward-looking view 1300 and that includes a message 1404 indicating that the "Arthur" media program is designated for automatic recording by NDVR facility 408 and will become available to access system 102. Window 1402 may further include selectable options to continue with the requested recording (e.g., "continue recording" option 1406), to add an entry for the network recording to a DVR user interface (e.g., "add to DVR list" option 1408) to represent and link to the network recording of the media program, and to cancel the recording (e.g., "cancel" option 1410). The message and the selectable options may help a user to make an informed decision about how to allocate finite local DVR resources based on scheduled network recordings.

Figure 15:
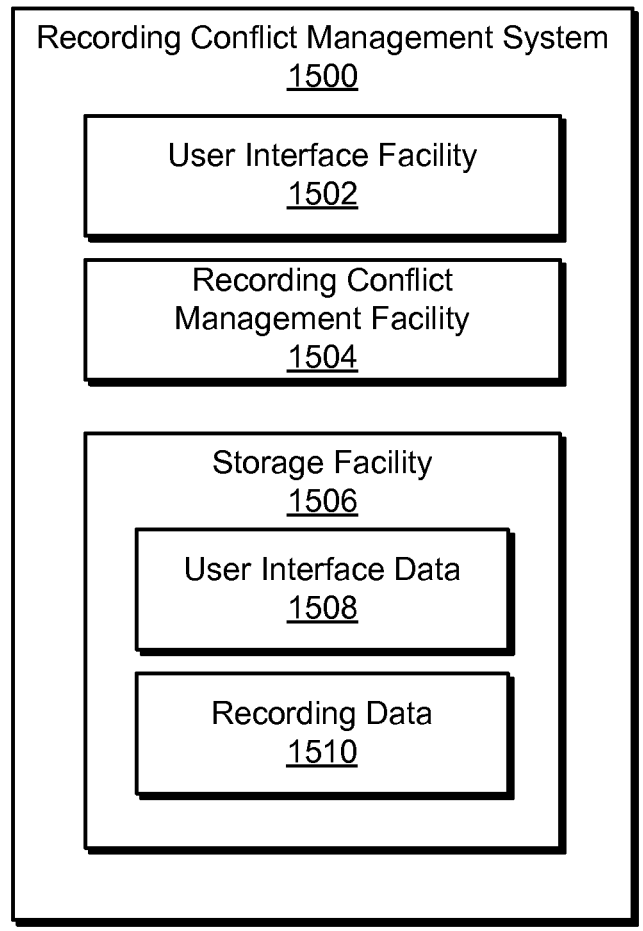
FIG. 15 illustrates an exemplary recording conflict management system according to principles described herein.

Information about designated recordings of media programs by NDVR facility 408 may be used to mitigate recording conflicts. To illustrate, FIG. 15 Shows an exemplary recording conflict management system 1500 ("system 1500") configured to manage recording conflicts. A recording conflict may occur when insufficient resources (e.g., local DVR resources) are available to record all of the recordings requested by a user of access system 120. For example, a user may request three recordings be performed simultaneously. A local DVR device may include only two tuners, in which case a recording conflict exists. System 1500 may be configured to manage such recording conflicts, including by detecting the conflicts and using information about network recordings by NDVR facility 408 to mitigate the conflicts.

As shown, system 1500 may include, without limitation, a user interface facility, a recording conflict management facility 1504 ("management facility 1504"), and a storage facility 1506 selectively and communicatively coupled to one another. Any suitable communication technologies, including any of the communication technologies mentioned herein, may be employed to facilitate communications between facilities 1502-606. It will be recognized that although facilities 1502-606 are shown to be separate facilities in FIG. 15, any of facilities 1502-606 may be combined into fewer facilities, such as into a single facility, or divided into more facilities as may serve a particular implementation.

System 1500 may be implemented by any suitable combination of computing devices and/or systems. For example, facilities 1502-1506 of system 1500 may be implemented entirely by access system 102, entirely by media content provider system 104, and/or by any other device and/or system. Alternatively, facilities 1502-1506 of system 1500 may be distributed across any combination of these systems and/or devices. Each of these facilities will now be described in more detail.

Storage facility 1506 may be configured to store user interface data 1508 generated and/or used by user interface facility 1502 and recording data 1510 generated and/or used by management facility 1504. User interface data 1508 may include any data used to generate a user interface provided by user interface facility 1502, such as described herein. Recording data 1510 may include any data used by management facility 1502 to manage recording conflicts, such as described herein. Storage facility 1506 may maintain additional or alternative data as may serve a particular implementation.

User interface facility 1502 may be configured to perform one or more of the user interface operations described herein, including providing output to and/or receiving input from a user. For example, user interface facility 1502 may be configured to provide output by generating and providing one or more user interfaces (e.g., GUIs) configured to facilitate user access to media content through management of recording conflicts. For instance, user interface facility 1502 may provide recording notifications and/or options in one or more user interfaces. Examples of such user interfaces and user interface views (e.g., GUIs and GUI views) are described herein.

User interface facility 1502 may be further configured to receive user input from a user of access system 102. The input may be provided by the user and received by user interface facility 1502 in any suitable way, including through any of the user interfaces provided by user interface facility 1502.

Management facility 1504 may be configured to detect a recording conflict between a set of requested recordings of a set of media programs. Management facility 1504 may detect the recording conflict in any suitable way, including by communicating with a local DVR device and/or application within access system 102.

Management facility 1504 may be configured to determine that a media program included in the set of conflicting media programs is designated for automatic recording by NDVR facility 408. This determination may be made in any suitable way. For example, management facility 1504 may access and use NDVR data 504 to determine whether any of the conflicting media programs is scheduled for automatic recording by NDVR facility 408. In certain examples, the determination may include verifying and a scheduled recording of the media program by NDVR facility 408 is for the same scheduled transmission of the media program as is involved in the recording conflict (e.g., the that the scheduled recording by NDVR facility 408 is on the same channel and at the same time slot as is the scheduled transmission of the media program involved in the conflict).

Management facility 1504 may be configured to perform at least one recording conflict mitigation operation that leverages the determined information that the media program is designated for automatic recording by NDVR facility 408. Examples of such mitigation operations will now be described.

In certain examples, management facility 1504 may be configured to provide a user with a notification of the recording conflict and that a media program involved in the conflict is scheduled for automatic recording by NDVR facility 408. In addition, management facility 1504 may be configured to provide one or more selectable options together with the notification. The selectable options may be configured to be selected by the user to select, from the media programs involved in the recording conflict, which requested local DVR recording to cancel.

Figure 16:
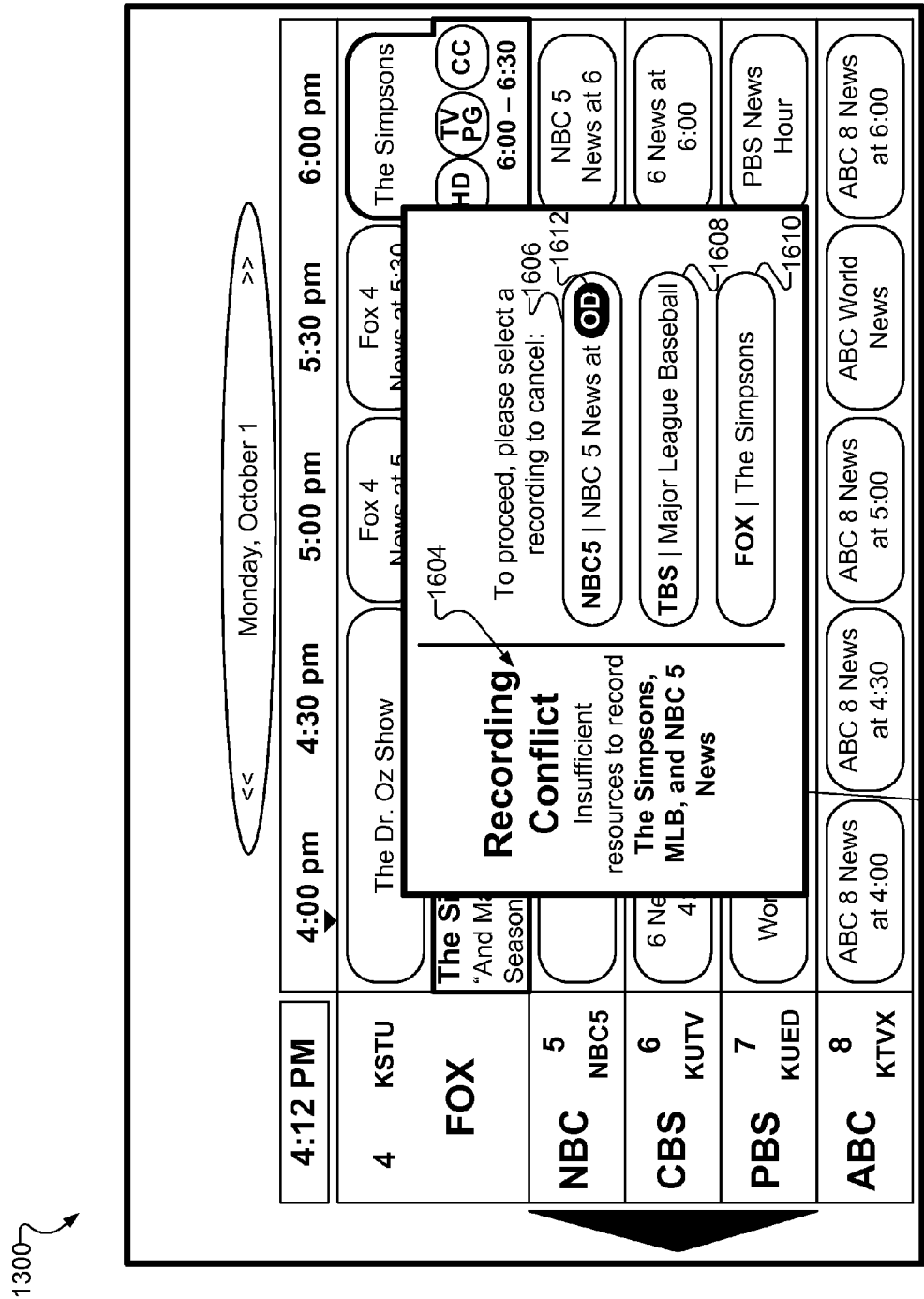
FIGS. 16-17 illustrate exemplary recording conflict management windows according to principles described herein.

To illustrate an example, while forward-looking view 1300 is displayed, a user may provide input to request that the scheduled live transmission of the "NBC 5 First at 5" media program represented in forward-looking view 1300 be recorded by a local DVR device. In response, management facility 1504 may detect a recording conflict that involves the requested recording of the "NBC 5 First at 5" media program and direct user interface facility 1502 to present a recording conflict notification window 1602 as shown in FIG. 16. As illustrated, window 1602 may include a recording conflict message 1604 configured to notify the user of the recording conflict. In addition, window 1602 may include a set of options configured to be selected by the user to indicate which requested local DVR recording to cancel in order to resolve the conflict. In FIG. 16, window 1602 includes an option 1606 to select to cancel a requested recording of the "NBC 5 First at 5" media program, an option 1608 to select to cancel a requested recording of a "Major League Baseball" media program, and an option 1610 to select to cancel a requested recording of a "Simpsons" media program.

Window may include a visual indicator 1612 indicating that one of the media programs involved in the recording conflict is designated for automatic recording by NDVR facility 408. This may help the user to make an informed decision about which requested recording to cancel and/or how to allocate finite resources of a local DVR device. For instance, the user may choose to cancel the requested local DVR recording of the "NBC 5 First at 5" media program because the use can ascertain from visual indicator 1612 that the "NBC 5 First at 5" media program is scheduled for network recording by NDVR facility 408 and will become available to the user (e.g., to access system 102) as VOD content 418.

In certain examples, management facility 1504 may be configured to automatically cancel a requested local DVR recording of a media program that is involved in a recording conflict and that is determined to be scheduled for automatic recording by NDVR facility 408. For example, management facility 1504 may communicate with a local DVR device to instruct the device to cancel the requested recording of the media program.

Figure 17:
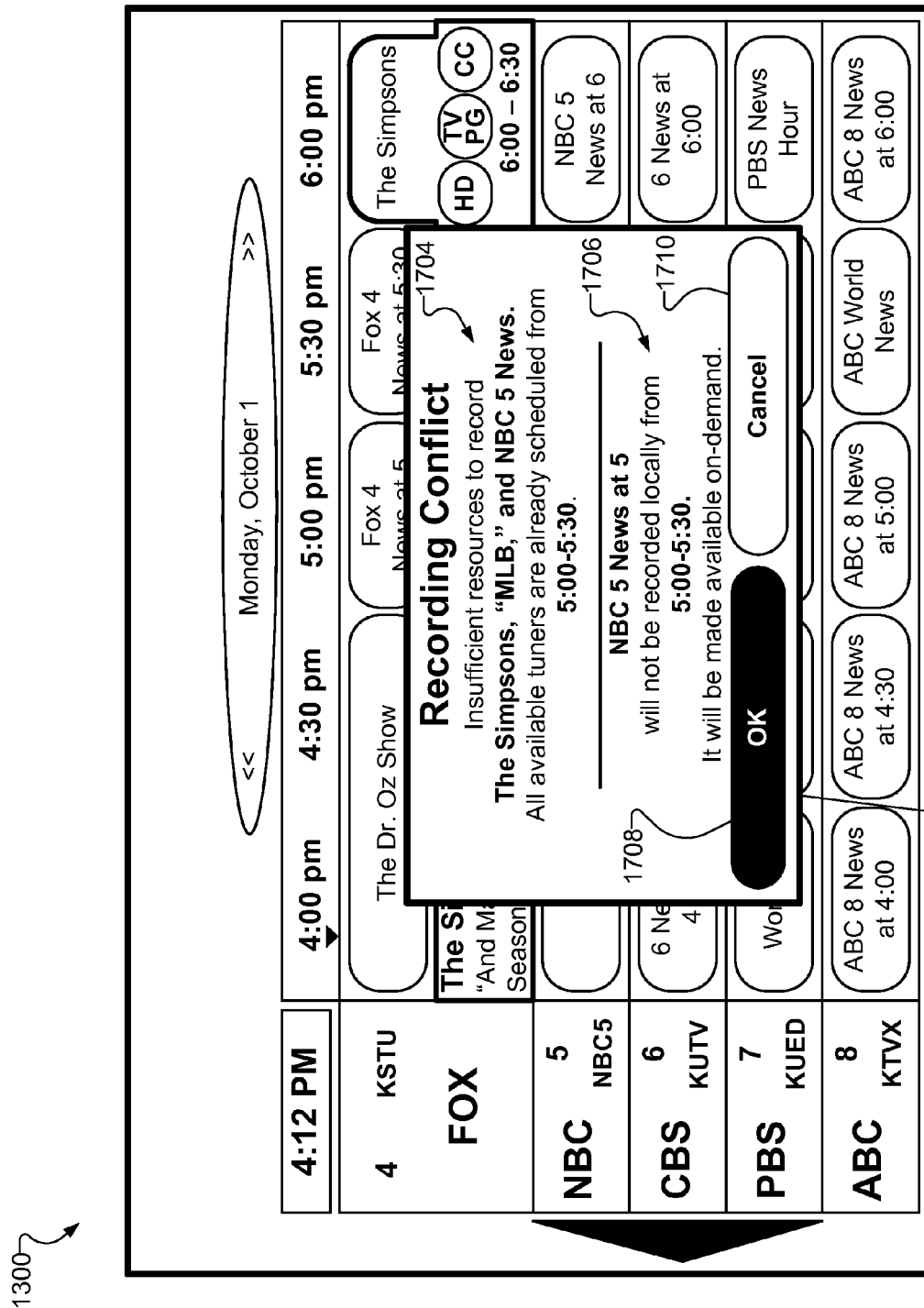

In some examples, management facility 1504 may notify the user that the requested recording is being canceled. For example, FIG. 17 illustrates a recording conflict notification window 1702 that may be displayed by user interface facility 1502. As shown, window 1702 may include a recording conflict message 1704 configured to notify the user of the recording conflict and a recording cancellation message 1706 configured to notify the user that the requested local DVR recording of the "NBC 5 First at 5" media program involved in conflict will be canceled and that the "NBC 5 First at 5" media program will be available on demand (e.g., by way of VOD facility 410). In addition, window 1702 may include a set of options that includes an option 1708 configured to be selected by the user to approve the cancellation of the requested recording and an option 1710 to cancel the cancellation of the requested recording.

In certain examples, management facility 1504 may be configured to provide convenient access to the network recording of the media program. For example, management facility 1504 may communicate with a local DVR device or application to add an entry representative of a link to the network recording of the media program to a DVR user interface. Accordingly, when the user access a list of recordings stored by a local DVR device, the user may also see information about and be able to access the network recording of the media program through the DVR user interface in the same way that the user would access a local DVR recording of the media program.

Figure 18:
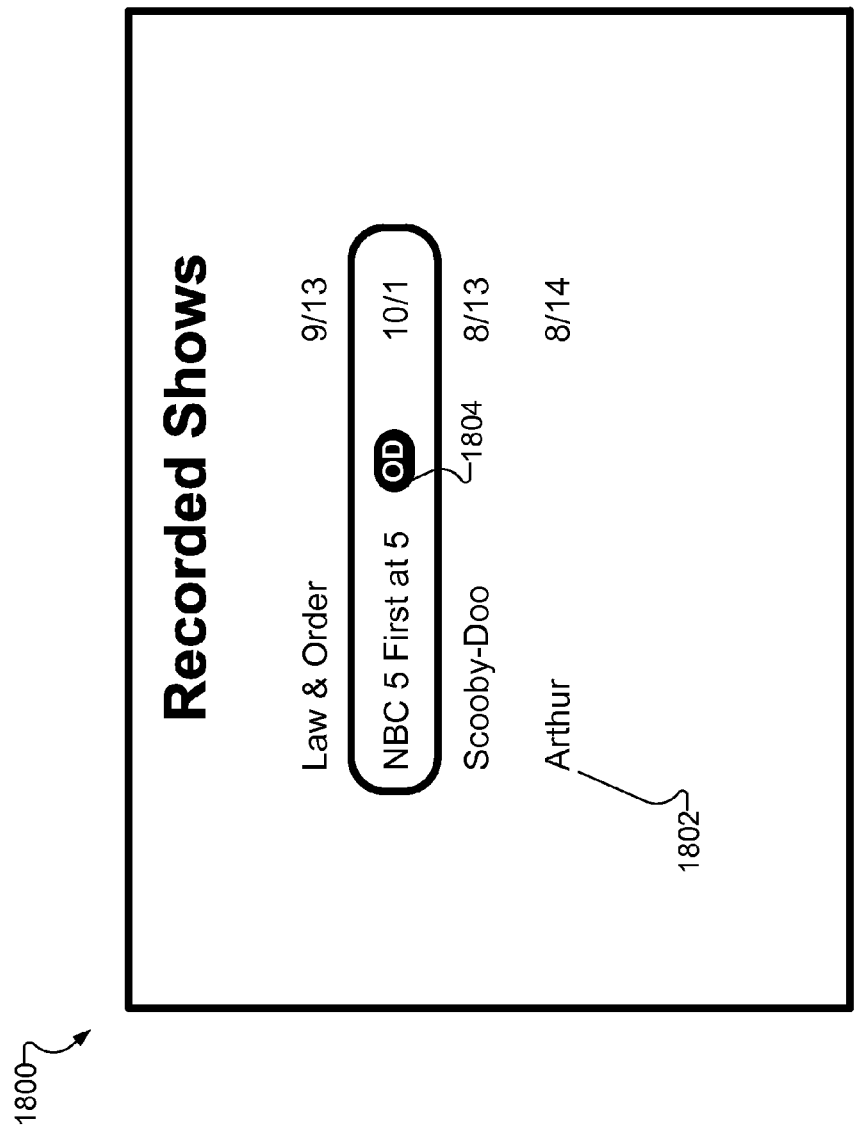
FIG. 18 illustrates an exemplary list of available recordings of media content according to principles described herein.

FIG. 18 illustrates a user interface view 1800 that includes a list 1802 of entries that represent recorded media programs. As shown, list 1802 may include an entry representing a network recording of the "NBC 5 First at 5" media program. This entry includes a visual indicator 1804 indicating that the entry represents a network recorded media program that is available on-demand (e.g., from VOD facility 410).

A user may utilize a selector 1806 to highlight and select the entry representing a network recording of the "NBC 5 First at 5" media program in list 1802. In response to such a selection, system 1500 may direct access system 102 to communicate with VOD facility 410 to access and play pack the network recording of the "NBC 5 First at 5" media program, without requiring any additional input from the user.

Figure 19:
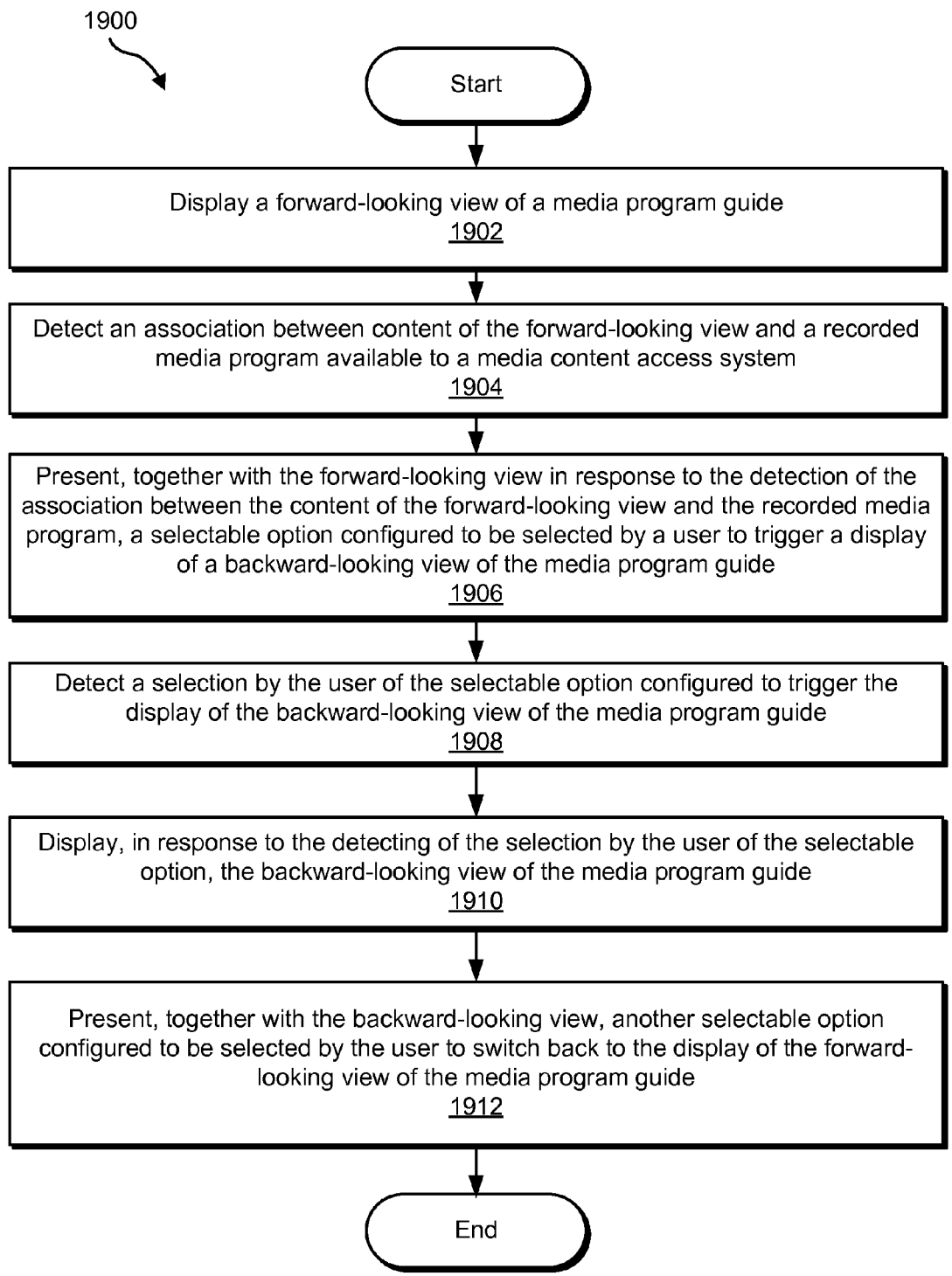
FIGS. 19-21 illustrate exemplary methods of facilitating user access to media content according to principles described herein.

FIG. 19 illustrates an exemplary method 1900 of facilitating user access to media content. While FIG. 19 illustrates exemplary steps according to one embodiment, other embodiments may omit, add to, reorder, combine, and/or modify any of the steps shown in FIG. 19. One or more of the steps shown in FIG. 19 may be performed by one or more of the systems described herein and/or any implementation thereof.

In step 1902, a media program guide user interface system displays a forward-looking view of a media program guide, such as described herein.

In step 1904, the system detects an association between content of the forward-looking view and a recorded media program available to a media content access system (e.g., access system 102) such as described herein.

In step 1906, the system presents, together with the forward-looking view in response to the detection of the association between the content of the forward-looking view and the recorded media program, a selectable option configured to be selected by a user to trigger a display of a backward-looking view of the media program guide, such as described herein. Step 1906 may be performed in response to the detection of the association in step 1904.

In step 1908, the system detects a selection by the user of the selectable option configured to trigger the display of the backward-looking view of the media program guide, such as described herein.

In step 1910, the system displays, in response to the detecting of the selection by the user of the selectable option, the backward-looking view of the media program guide, such as described herein.

In step 1912, the system presents, together with the backward-looking view, another selectable option configured to be selected by the user to switch back to the display of the forward-looking view of the media program guide, such as described herein.

Figure 20:
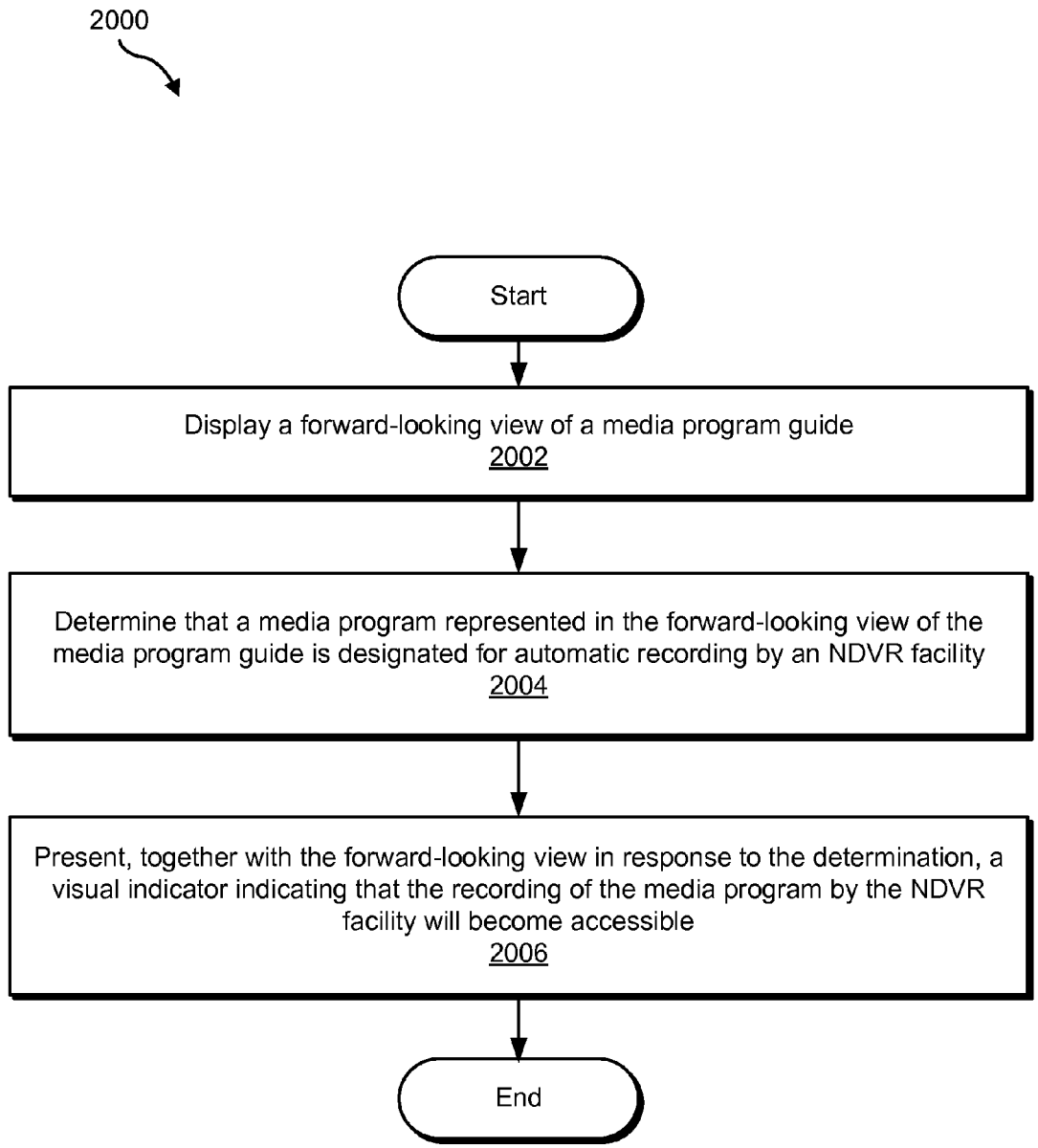

FIG. 20 illustrates an exemplary method 2000 of facilitating user access to media content. While FIG. 20 illustrates exemplary steps according to one embodiment, other embodiments may omit, add to, reorder, combine, and/or modify any of the steps shown in FIG. 20. One or more of the steps shown in FIG. 20 may be performed by one or more of the systems described herein and/or any implementation thereof.

In step 2002, a media program guide user interface system displays a forward-looking view of a media program guide, such as described herein.

In step 2004, the system determines that a media program represented in the forward-looking view of the media program guide is designated for automatic recording by an NDVR facility, such as described herein.

In step 2006, the system presents, together with the forward-looking view in response to the determination in step 2004, a visual indicator indicating that the recording of the media program by the NDVR facility will become accessible (e.g., to access system 102), such as described herein.

Figure 21:
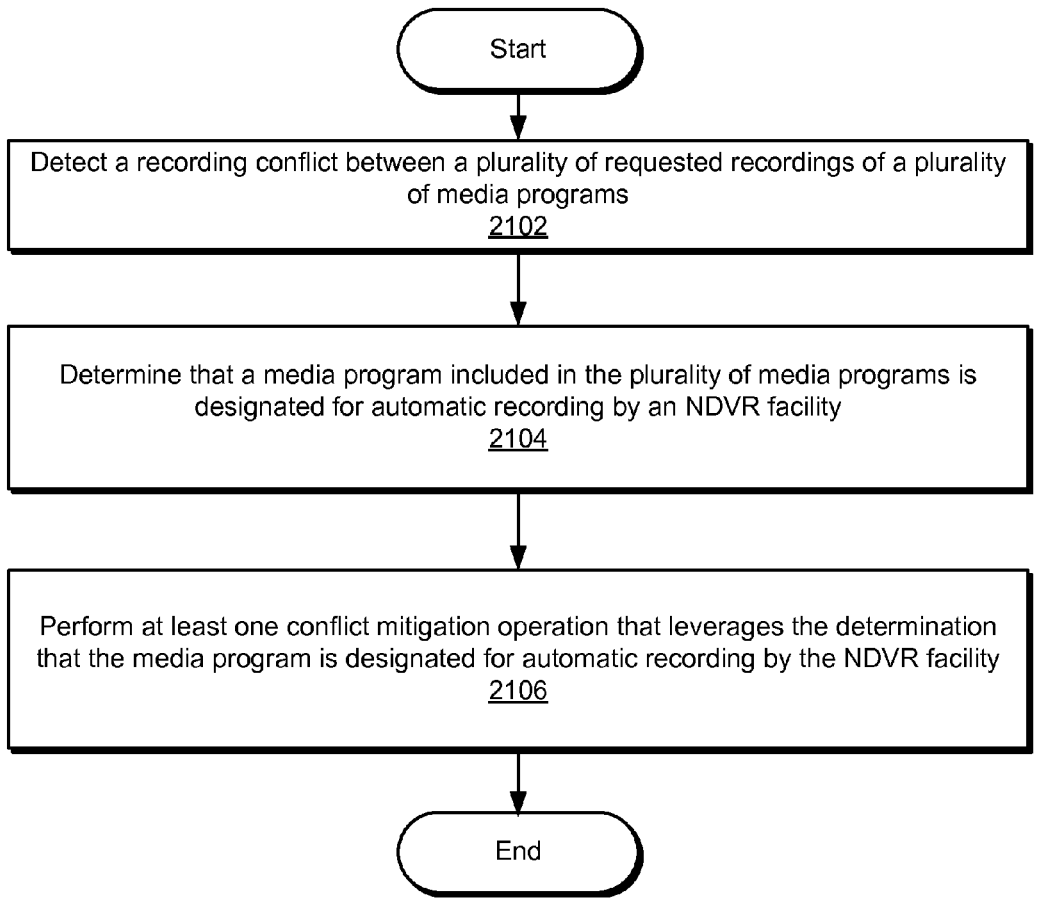

FIG. 21 illustrates an exemplary method 2100 of facilitating user access to media content. While FIG. 21 illustrates exemplary steps according to one embodiment, other embodiments may omit, add to, reorder, combine, and/or modify any of the steps shown in FIG. 21. One or more of the steps shown in FIG. 21 may be performed by one or more of the systems described herein and/or any implementation thereof.

In step 2102, a recording conflict management system detects a recording conflict between a set of requested recordings of a set of media programs, such as described herein.

In step 2104, the system determines that a media program included in the set of media programs involved in the recording conflict is designated for automatic recording by an NDVR facility, such as described herein.

In step 2106, the system performs at least one conflict mitigation operation that leverages the determination that the media program is designated for automatic recording by the NDVR facility, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 22:
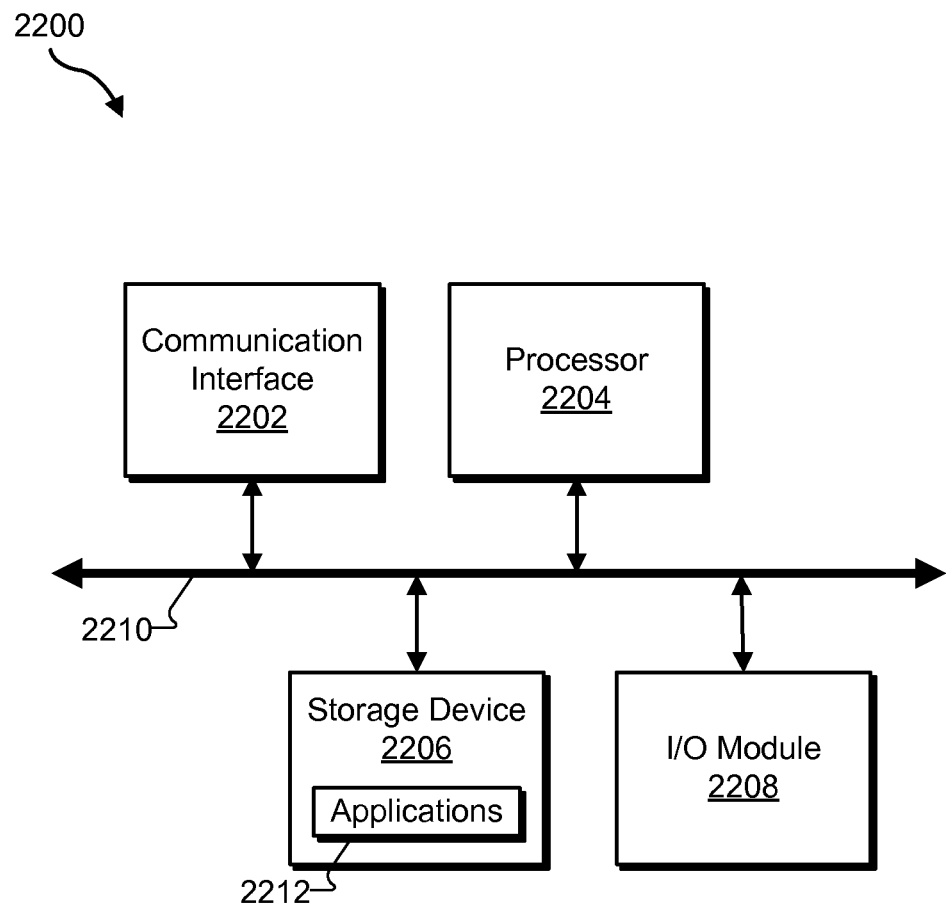
FIG. 22 illustrates an exemplary computing device according to principles disclosed herein.

FIG. 22 illustrates an exemplary computing device 2200 that may be configured to perform one or more of the processes described herein. As shown in FIG. 22, computing device 2200 may include a communication interface 2202, a processor 2204, a storage device 2206, and an input/output ("I/O") module 2208 communicatively connected via a communication infrastructure 2210. While an exemplary computing device 2200 is shown in FIG. 22, the components illustrated in FIG. 22 are not intended to be limiting. Additional or alternative components may be used in other embodiments. Components of computing device 2200 shown in FIG. 22 will now be described in additional detail.

Communication interface 2202 may be configured to communicate with one or more computing devices. Examples of communication interface 2202 include, without limitation, a wired network interface (such as a network interface card), a wireless network interface (such as a wireless network interface card), a modem, an audio/video connection, and any other suitable interface.

Processor 2204 generally represents any type or form of processing unit capable of processing data or interpreting, executing, and/or directing execution of one or more of the instructions, processes, and/or operations described herein. Processor 2204 may direct execution of operations in accordance with one or more applications 2212 or other computer-executable instructions such as may be stored in storage device 2206 or another computer-readable medium.

Storage device 2206 may include one or more data storage media, devices, or configurations and may employ any type, form, and combination of data storage media and/or device. For example, storage device 2206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 2206. For example, data representative of one or more executable applications 2212 configured to direct processor 2204 to perform any of the operations described herein may be stored within storage device 2206. In some examples, data may be arranged in one or more databases residing within storage device 2206.

I/O module 2208 may be configured to receive user input and provide user output and may include any hardware, firmware, software, or combination thereof supportive of input and output capabilities. For example, I/O module 2208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 2208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 2208 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 2200. For example, one or more applications 2212 residing within storage device 2206 may be configured to direct processor 2204 to perform one or more processes or functions associated with user interface facility 602, detection facility 604, user interface facility 1502, and/or management facility 1504. Likewise, storage facility 606 and/or storage facility 1506 may be implemented by or within storage device 2206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   displaying, by a media program guide user interface system, a forward-looking view of a media program guide, the forward-looking view including a matrix grid of cells arranged relative to a channel axis and a forward-looking time axis, the cells representing media programs scheduled for transmission on channels arranged along the channel axis in the forward-looking view and at times arranged along the forward-looking time axis in accordance with a media transmission schedule;
   detecting, by the media program guide user interface system, an association between content of the forward-looking view and a recorded media program available to a media content access system; and
   presenting, by the media program guide user interface system together with the forward-looking view in response to the detecting of the association between the content of the forward-looking view and the recorded media program, a selectable option configured to be selected by a user to trigger a switch away from the display of the forward-looking view of the media program guide and to a display of a backward-looking view of the media program guide such that the backward-looking view is not provided for display together with the forward-looking view, the backward-looking view including a channel axis having one or more channel identifiers that are arranged in a rightmost column of the media program guide.

2. The method of claim 1, wherein the recorded media program comprises a recording of a media program captured, by a network digital video recording ("NDVR") device remote to the user, from a past scheduled transmission of the media program.

3. The method of claim 2, wherein the recording of the media program is stored as a video-on-demand ("VOD") asset accessible by the media content access system.

4. The method of claim 1, wherein the recorded media program comprises a recording of a media program captured, by a digital video recording ("DVR") device local to the user, from a past scheduled transmission of the media program.

5. The method of claim 1, wherein the detecting of the association between the content of the forward-looking view and the recorded media program comprises:
   identifying a channel included in the channels arranged along the channel axis in the forward-looking view; and
   identifying the recorded media program as being associated with the channel.

6. The method of claim 1, wherein the detecting of the association between the content of the forward-looking view and the recorded media program comprises:
   identifying a selected cell included in the matrix grid of cells in the forward-looking view;
   identifying a channel included in the channels arranged along the channel axis in the forward-looking view and that corresponds to the selected cell; and
   identifying the recorded media program as being associated with the channel.

7. The method of claim 1, wherein the detecting of the association between the content of the forward-looking view and the recorded media program comprises:
   identifying a selected cell included in the matrix grid of cells in the forward-looking view;
   identifying a media program represented by the selected cell; and
   identifying the recorded media program as being associated with the media program represented by the selected cell.

8. The method of claim 1, further comprising:
   detecting, by the media program guide user interface system, a selection by the user of the selectable option configured to trigger the display of the backward-looking view of the media program guide; and
   displaying, by the media program guide user interface system in response to the detecting of the selection by the user of the selectable option, the backward-looking view of the media program guide in place of the forward-looking view of the media program guide.

9. The method of claim 8, wherein the backward-looking view of the media program guide comprises a backward-looking time axis and a backward-looking matrix grid of cells arranged to the left of the one or more channel identifiers in the backward-looking view, the cells included in the backward-looking matrix grid of cells representing a set of recorded media programs that comprise the recorded media program and that are captured from past transmissions on channels arranged along the channel axis in the backward-looking view at times arranged along the backward-looking time axis.

10. The method of claim 9, wherein the times arranged along the backward-looking time axis form a discontinuous timeline comprising only programming time slots to which the cells included in the backward-looking matrix grid of cells correspond.

11. The method of claim 9, wherein:
   the times arranged along the backward-looking time axis are arranged horizontally and proceed generally backward in time moving away from the channel axis in the backward-looking view and toward a left edge of the backward-looking matrix grid.

12. The method of claim 8, wherein the backward-looking view of the media program guide comprises one or more items arranged in a list, the one or more items in the list representing a set of recorded media programs that comprise the recorded media program.

13. The method of claim 8, wherein the backward-looking view of the media program guide includes data representing a set of media content recordings that includes at least one of:
   a media content recording captured by a network digital video recording ("NDVR") device remote to the user; and
   a media content recording captured by a digital video recording ("DVR") device local to the user.

14. The method of claim 8, further comprising presenting, by the media program guide user interface system together with the backward-looking view, another selectable option configured to be selected by the user to switch away from the display of the backward-looking view and back to the display of the forward-looking view of the media program guide.

15. The method of claim 1, embodied as computer-executable instructions on at least one non-transitory computer-readable medium.

16. A system comprising:
   a processor:
   a user interface facility that directs the processor to provide a forward-looking view of a media program guide for display on a display screen associated with a media content access system, the forward-looking view including a matrix grid of cells arranged relative to a channel axis and a forward-looking time axis, the cells representing live media programs scheduled for transmission on channels arranged along the channel axis in the forward-looking view and at times arranged along the forward-looking time axis in accordance with a media transmission schedule; and
   a detection facility that directs the processor to detect, during the display of forward-looking view, an association between content of the forward-looking view and a non-live media program accessible by the media content access system;
   wherein the user interface facility further directs the process to present, together with the forward-looking view in response to the detection of the association between the content of the forward-looking view and the non-live media program, a selectable option configured to be selected by a user to trigger a switch away from the display of the forward-looking view of the media program guide and to a display of a backward-looking view of the media program guide such that the backward-looking view is not provided for display together with the forward-looking view, the backward-looking view including a channel axis having one or more channel identifiers that are arranged in a right-most column of the media program guide.

17. The system of claim 16, wherein:
   the detection facility further directs the processor to detect a selection by the user of the selectable option configured to trigger the switch away from the display of the forward-looking view of the media program guide and to the display of the backward-looking view of the media program guide; and
   the user interface facility further directs the processor to display, in response to the detection of the selection by the user of the selectable option, the backward-looking view of the media program guide in place of the forward-looking view of the media program guide.

18. The system of claim 17, wherein the user interface facility further directs the processor to present, together with the backward-looking view, another selectable option configured to be selected by the user to switch away from the display of the backward-looking view and back to the display of the forward-looking view of the media program guide.

19. The system of claim 18, wherein:
   the detection facility further directs the processor to detect a selection by the user of the another selectable option configured to trigger the switch away from the display of the backward-looking view of the media program guide and back to the display of the forward-looking view of the media program guide; and
   the user interface facility further directs the processor to display, in response to the detection of the selection by the user of the another selectable option, the forward-looking view of the media program guide in place of the backward-looking view of the media program guide.

20. The system of claim 17, wherein the backward-looking view of the media program guide comprises a backward-looking time axis and a backward-looking matrix grid of cells arranged to the left of the one or more channel identifiers in the backward-looking view, the cells included in the backward-looking matrix grid of cells representing a set of recorded media programs that comprise the recorded media program and that are captured from past transmissions on channels arranged along the channel axis in the backward-looking view at times arranged along the backward-looking time axis.

21. The system of claim 20, wherein the times arranged along the backward-looking time axis form a discontinuous timeline comprising only programming time slots to which the cells included in the backward-looking matrix grid of cells correspond.

22. The system of claim 20, wherein:
   the times arranged along the backward-looking time axis are arranged horizontally and proceed generally backward in time moving away from the channel axis in the backward-looking view and toward a left edge of the backward-looking matrix grid.

23. The system of claim 20, wherein:
   the set of recorded media programs represented by the cells included in the backward-looking matrix grid of cells include at least one media program recorded by a network digital video recording ("NDVR") device remote to the user and at least one media program recorded by a digital video recording ("DVR") device local to the user; and
   each cell in the grid of cells included in the backward-looking matrix grid visually indicates whether the cell represents a media program recorded by the NDVR device or the DVR device.

24. The system of claim 16, wherein the selectable option configured to be selected by the user to trigger the switch away from the display of the forward-looking view of the media program guide and to the display of a backward-looking view of the media program guide comprises an arrow icon pointing backward in time.

* * * * *